United States Patent
Weihrauch

(10) Patent No.: US 7,294,297 B2
(45) Date of Patent: *Nov. 13, 2007

(54) METHOD AND DEVICE OF THE PRODUCTION OF BRUSHES

(75) Inventor: Georg Weihrauch, Wald-Michelbach (DE)

(73) Assignee: Geka Brush GmbH, Bechhofen-Waizendorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/500,970

(22) PCT Filed: Jan. 9, 2003

(86) PCT No.: PCT/EP03/00131

§ 371 (c)(1),
(2), (4) Date: Jul. 8, 2004

(87) PCT Pub. No.: WO03/059594

PCT Pub. Date: Jul. 24, 2003

(65) Prior Publication Data

US 2005/0006819 A1  Jan. 13, 2005

(30) Foreign Application Priority Data

Jan. 17, 2002  (DE) ................. 102 01 635

(51) Int. Cl.
*B29C 45/34* (2006.01)
(52) U.S. Cl. .................. 264/102; 264/328.12
(58) Field of Classification Search ........... 264/328.12, 264/101, 102; 425/805, 812, 549, 546
See application file for complete search history.

(56) References Cited

U.S. PATENT DOCUMENTS 2,621,369 A * 12/1952 Gantz et al. .................. 29/469

(Continued)

FOREIGN PATENT DOCUMENTS

DE  16 36 080  2/1952

(Continued)

OTHER PUBLICATIONS

Rosato, et al. Injection Molding Handbood, 3rd edition, 2000, pp. 241-253,307-313,667-675.*

(Continued)

*Primary Examiner*—Jill L. Heitbrink
(74) *Attorney, Agent, or Firm*—Browdy and Neimark, PLLC

(57) ABSTRACT

In a method for producing a bristle from thermoplastic polymers through injection molding, the molten polymer mass is injected under pressure into a bristle-molding channel of predetermined length having a predetermined cross-section along this length and the channel is vented during injection molding. To produce injection-molded bristles with excellent bending behavior, the magnitude of the injection pressure is adjusted in dependence on the cross-sectional extension of the bristle-molding channel such that a shear flow is generated with high core speed in the center of the molten polymer mass flow and large shearing effect due to wall friction of the molten polymer mass under distinct longitudinal orientation of the polymer molecules at least in the region of the molten polymer mass close to the wall, which is maintained along the channel wherein the channel is simultaneously vented along its length to support maintenance of the shear flow. A device for carrying out the method is also described.

28 Claims, 14 Drawing Sheets

U.S. PATENT DOCUMENTS

| | | | | |
|---|---|---|---|---|
| 2,651,810 | A | * | 9/1953 | Snyder .................. 264/519 |
| 3,357,058 | A | * | 12/1967 | Kutik ..................... 425/588 |
| 4,126,291 | A | * | 11/1978 | Gilbert et al. ............ 249/63 |
| 4,244,076 | A | * | 1/1981 | Meyer .................... 15/188 |
| 5,217,732 | A | * | 6/1993 | Rudolf et al. ............ 425/572 |
| 5,531,582 | A | * | 7/1996 | Klinkhammer ......... 425/190 |

FOREIGN PATENT DOCUMENTS

| | | |
|---|---|---|
| DE | 25 24 538 | 12/1976 |
| DE | 43 19 257 | 12/1994 |
| JP | 62 178 315 | 8/1987 |
| JP | 03 266 632 | 11/1991 |
| WO | WO 94 13 461 | 6/1994 |

OTHER PUBLICATIONS

Rees, Herbert, Understanding Injection Mold Design, 2001, Hanser Publishers, pp. 15-18.*

Colangelo, Tony et al., Melt Delivery Systems for Thinwall Applications with Engineering Resins, ANTEC 1997 Plastics: PLatics Saving Planet Earth, vol. 1: Processing, seven pages.*

Walter Mink, "Grundzüge der Spritzgieẞtechnik" 5. Auflage 1979, Zechner & Huethig Verlag GmbH, Speyer am Rhein, p. 480.

* cited by examiner

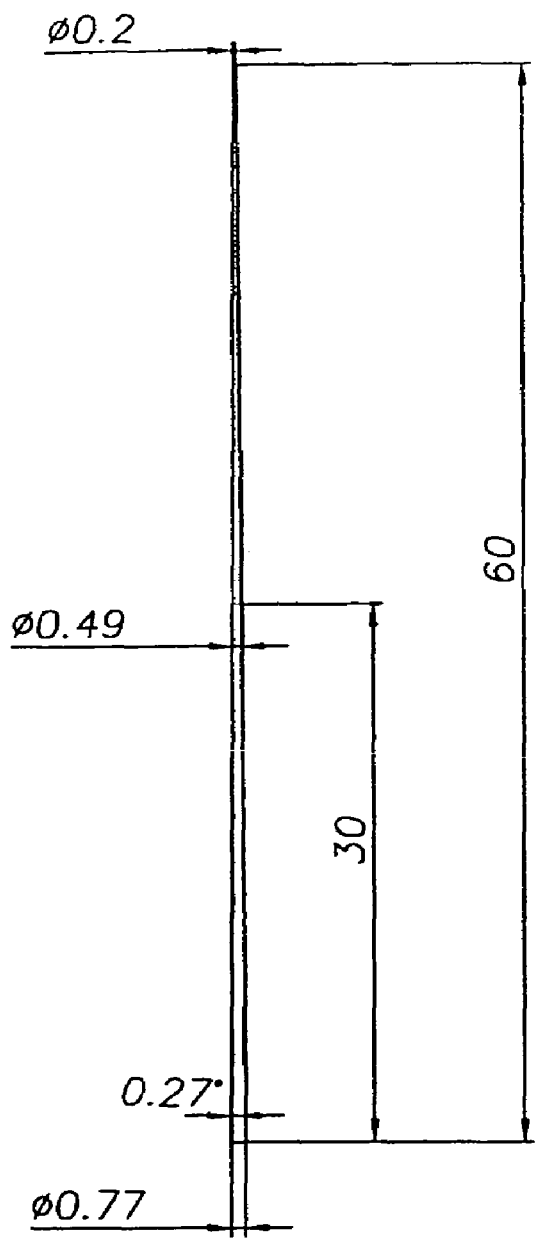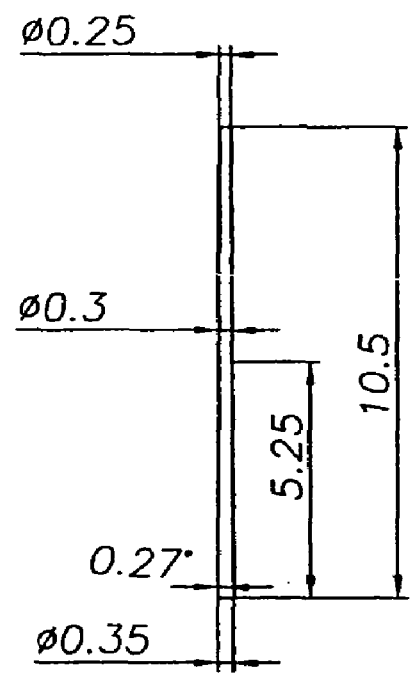
Fig.7                    Fig.8

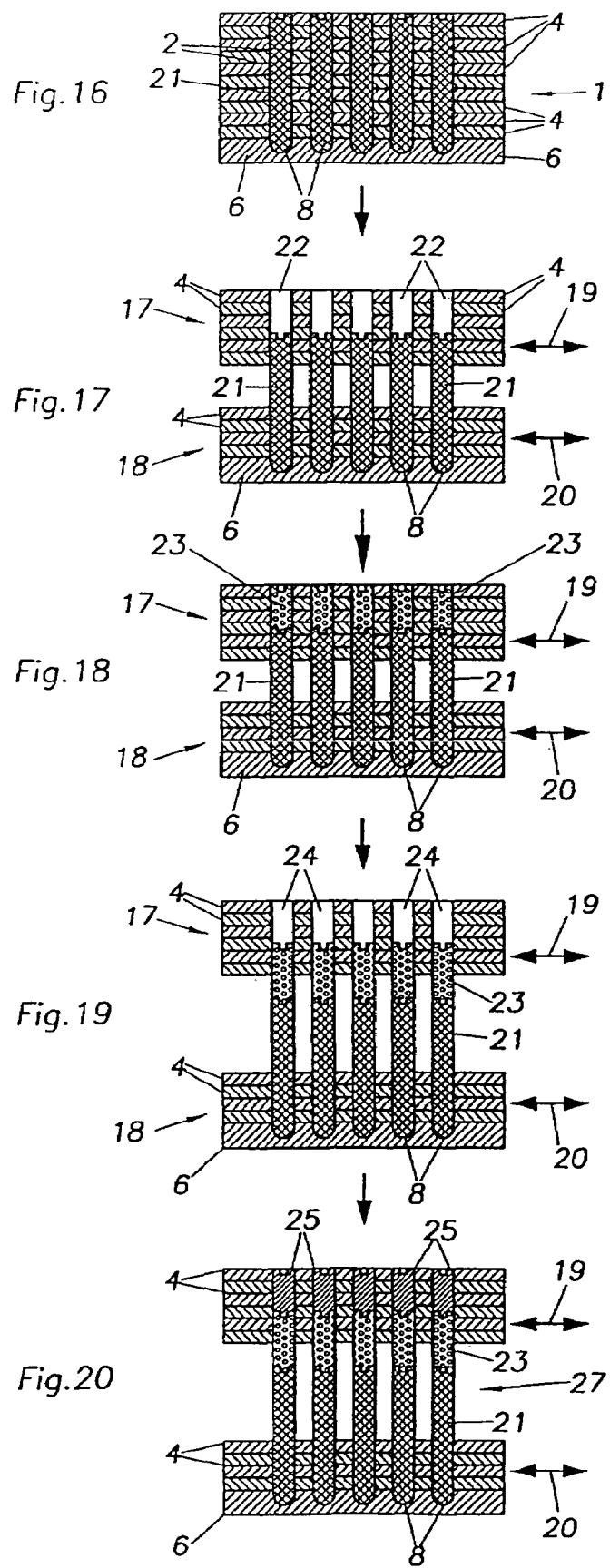

METHOD AND DEVICE OF THE PRODUCTION OF BRUSHES

This application is the national stage of PCT/EP03/00131 filed on Jan. 09, 2003 and also claims Paris Convention priority of DE 102 01 635.6 filed Jan. 17, 2002.

BACKGROUND OF THE INVENTION

The invention concerns a method for producing a bristle from a thermoplastic polymer through injection molding, wherein the molten polymer mass is injected under pressure into a bristle-molding channel of predetermined length having a predetermined cross-sectional shape along this length and the channel is vented during injection molding. The invention also concerns a device for carrying out this method.

Animal hair and natural fibers which were previously used as bristle material for producing brushes, paint brushes or the like have been substantially replaced by artificial bristles, wherein the production of the bristle material is based largely on long-standing technology related to the production of synthetic textile fibers, i.e. extrusion or spinning processes. However, a bristle is subjected to completely different conditions than an endless fiber in a fiber composite. It is free and fixed at only one end and can be regarded in terms of stability as a bar which bends and which is fixed at one end. Pressure or compression forces and sometimes also tensile forces occur during use. Compared to endless fibers, the production requirements are different with regard to bending strength, fatigue strength under reversed bending stresses, buckling resistance and bend recovery.

Monofilaments for bristles are therefore extruded having relatively large diameters up to a few millimeters. Shaping by the extrusion and spinning nozzle produces a certain longitudinal orientation of the molecules in the molten polymer mass which is however not sufficient to provide the monofilament with the desired properties. The monofilament is therefore drawn, i.e. stretched under appropriate drawing forces, which usually requires pre-drawing, post-drawing, and subsequently thermal stabilization, which can be repeated, if required. The endless monofilament is subsequently wound up and the wound-up product is again stabilized, if required.

If, for production of brushes, the endless monofilaments are not processed directly from the spool—which is still the exception today—a large number of monofilaments are combined into strands and bound and cut to suitable lengths of between 60 and 120 cm. The strand material is again cut to a length, which is slightly longer than the final bristles thereby producing waste of approximately 30% of the initial material. For high-quality plastic bristles, e.g. of polyamides (nylon), which are required for quality brushes, e.g. toothbrushes, hygiene brushes etc., the price for the raw material is the most expensive factor in the brush price. The price of extruded bristles is consequently considerably increased by the large amount of waste.

For brushes, the production of bristles is followed by mounting the bristles to the bristle support, which can be effected either mechanically or thermally. Since the free length of the bristles largely varies in this intermediate state, shearing-off and in most cases post-processing of the bristles and mainly of the bristle ends follows to remove the sharp cutting edges. If the effective brushing surface formed by the free ends must meet special requirements, e.g. for toothbrushes, the brushing surface must either be given a contour already during mounting or the flat brushing surface must be subsequently shaped, which produces additional waste of approximately 10%.

Considering the fact that approximately 90% of the worldwide need of bristles is limited to bristles having a length of <10 cm, the endless production through spinning including all subsequent work processes until the bristle is finished is highly uneconomical, due to the raw material waste alone. Further limitations result from the fact that monofilaments can usually only be produced with cylindrical shape and with profiled cross-section such that the structure of the bristles is limited and extensive later processing may be required.

Injection molding production of brush bodies, brush handles, paint brush handles etc. from plastic material was established quite early in the brush and paint brush industry to utilize the numerous structural possibilities of injection molding technology. Various attempts were made to produce the brush body with integral bristles through injection molding. In practice, these methods are used only for bristles of the lowest quality and stability requirements, in particular those which are used only once or a few times. Injected bristles have a much worse bending strength, fatigue strength under reversed bending stresses and buckling strength, insufficient bend recovery and low wear resistance. Injected brushes have highly conical bristles with relatively large cross-sections in the root region of the bristle due to the method, and are therefore more appropriately described as pins or bolts rather than bristles. Some known injection molding methods in brush technology are described below.

Rotating bristles for grinding and polishing surfaces are composed of disc-shaped brush segments, which are produced individually through injection molding (U.S. Pat. No. 5,903,951). Each brush segment comprises a central support disc from which the bristles outwardly extend radially or at an angle inclined against the direction of rotation relative to the radial direction. The brush segments consist of a thermoplastic or thermoelastic polymer (TP or TPE), which is filled with abrasive particles. The bristles preferably have a length of between 1 cm and 5 cm and a diameter of between 0.25 mm and 10 mm, preferably between 1 mm and 2 mm. In one concrete embodiment, the conical bristles have a length of 75 mm and a diameter of 2 mm at the root and 1.5 mm at the tip. The two-part injection mold consists of two plates having the cavities for the support disc and the bristles on mutually facing sides, which simultaneously form the mold-separating plane. The molten polymer mass with the admixed abrasive particles is injected from the center of the support disc at an injection pressure of 690 to 6900 kPa (0.59 to 69 bar). The preferred pressure range is between 2070 to 4830 kPa. The required venting of the mold cavity occurs in the mold-separating plane, i.e. parallel to the bristles. This unavoidably produces two mold-separating seams on the bristle jacket, which extend from the root to beyond the tip. The abrasive particles cause additional narrowing of the small cross-sections in the bristle cavities and the molten polymer mass solidifies too quickly at these locations prior to complete filling of the bristle cavity. For this reason, injection molding is preferred in two steps, wherein a highly filled molten polymer mass is initially injected into the bristle cavities and a more or less unfilled molten polymer mass is then subsequently injected. One of average skill in the art knows that during injection molding, practically no molecular orientation takes place in the polymer (US 2001/0007161 A1, see column 1, paragraph 0006). This produces a completely insufficient bending behavior for bristles, which is additionally deteriorated by the admixed abrasive particles. The stated maximum injection pressure of 6900 kPa (69 bar) is strongly reduced through the flow resistance in the narrow mold cavity for forming the carrier disc and in the subsequent bristle channels such that the person skilled in the art may have reasonable doubts about the practicability of this method.

U.S. Pat. No. 3,618,154 describes the production of a toothbrush in one single injection molding process wherein the bristles on the brush head are injected in a type of bundle arrangement. Towards this end, the two-part injection molding tool whose mold-separating plane is in the plane of the bristle head, has substantially cylindrical bores which extend from the mold surface forming the bristle side of the brush head. Substantially cylindrical mold cores engage in the bores from the opposite side wherein one of their end faces forms part of the mold surface for the bristle support side of the head and—starting therefrom—comprise groove-like depressions which extend along jacket lines. These groove-like depressions taper uniformly and conically from the front-side mold surface towards the other end and terminate in a semi-spherical dome on the jacket of the mold core on which the depressions are uniformly distributed. Each depression forms, together with the bore wall in the one part of the injection mold, a bristle-molding channel, which consequently conically tapers from the mold cavity for the brush head towards the other end. The channels are vented across their entire length in the separating surface between mold core and bore, i.e. substantially parallel to the bristles. U.S. Pat. No. 3,618,154 requires high precision of the cooperating surfaces. Each bristle inevitably has two mold-separating seams, which extend along jacket lines on the bristle. It is also not possible to produce bristles with circular cross-section since the groove-like depression in the mold core has a substantially larger radius of curvature than the bore. This produces a cross-sectional shape with discontinuities at which the mold-separating seams, which cannot be subsequently removed, immediately form. The bending behavior of the bristle differs in different directions transverse to its axis. Furthermore, the bundles are not filled (their center is free) so that the bristles cannot support each other as is the case in conventional bundles. The serious problem of removing the individual bristles from the mold is intended to be solved through corresponding conicity of the bristle-forming grooves. This can obviously not work, since the mold cores are simultaneously used as ejector pins which push towards the bristle tips during release from the mold via the dome-shaped ends of the groove-like depressions. The conicity is intended to make the bristle ends relatively flexible during use of the toothbrush. This document does not describe any measures which extend beyond conventional injection molding technology and which could improve the bending behavior of the injection-molded bristles. In this case as well, the polymer molecules, as is usual in injection molding, have the energetically favorable balled shape, which is, however, unfavorable with regard to stability (US 2001/0007161 A1).

Moreover, in conventional toothbrush production (U.S. Pat. No. 5,158,342) the bristle stock is subsequently injected into a prepared depression of the brush head of a pre-injected brush body, consisting of handle and the brush head. This produces bristles of completely insufficient bending behavior due to the conventional injection molding technology with injection pressures of 30 to 60 bar (3000 to 6000 kPa).

GB 2 151 971 also describes two-step production of bristle stock and a bristle support. In particular, this document clearly illustrates the problem of releasing the bristles from the bristle-molding channels. Despite the strong conicity of the bristles, which is favorable for release from the mold, the mold removal process is slow and highly controlled, which impairs the efficiency of the injection molding system. Injection molding measures to increase the bristle stability are not described.

Much better results are obtained according to an older, not pre-published patent application of the inventor (PCT/EP01/07439) with which a bristle support is provided with bores which have a nozzle-like cross-sectional shape. The molten polymer mass for the bristles is injected through the nozzle-like bores into adjoining molding channels of an injection mold. This method produces a semi-finished product from bristle support and bristles or also—with corresponding shape of the bristle support—a finished brush, wherein the bristles have bending behavior characteristics, which are similar in quality to those of extruded, bristles. The shape of the bristles is not subjected to the constraints of endless production of extruded monofilaments.

U.S. Pat. No. 4,712,936 discloses production of small application brushes, e.g. for decorative cosmetics, which are inserted into a container and mounted to the sealing cap of this container, as one-part injection molding part which consists of cap, a stem centrically adjoining the inner side thereof, and brush bristles disposed at the end thereof. The mold cavities for the cap, the centrical stem and the joining bristle-molding channels are formed in the two parts of an injection molding tool with axial orientation, wherein the cap opening is in the mold separating plane thereof. The stem and bristles are produced through mold cores, which are pushed coaxially into each other. The injection side is on the cap. The molten polymer mass must consequently traverse long flow paths with several cross-sectional changes and overcome large mass requirements before reaching the thin bristle channels. The entire venting of the stem and bristle region takes place at the ends of the bristle channels via a cylindrical closure with knurl structure which is to form a type of filter with high flow resistance. This prior art shows that the bristles that can be produced through injection molding are not suitable, in particular, for use as paintbrushes. After removal from the mold, they are therefore re-heated outside of the injection mold and are subsequently drawn. The cross-section is thereby reduced which inevitably increases the separation between the bristles. However, for application brushes of this type, the bristles should be disposed at minimum mutual separations to produce capillary action between the bristles for storing and retaining the application medium.

Attempts have also been made (DE 21 55 888 C3) to produce a brush with formed-on bristles through injection molding with an injection molding tool having a first tool part for the bristle support and a second tool part largely covering the open mold cavity in which a short channel is formed which widens at its opposite end and is closed at that location. During injection, the molten polymer mass penetrates from the mold cavity of the support into the short channel and flows into the widening to produce a short bolt with a head. During opening of the mold, the head is carried along and the bolt-like bristle blank is drawn. This can produce a certain molecular orientation, which increases the stability—similar to production of endless monofilaments.

Attempts to replace production of bristles from extruded endless monofilaments and their subsequent mounting to separately produced brush bodies, with an injection molding of the entire brush with bristles have therefore obviously failed (US 2001/0007161 A1).

This is also true for the known suggestion of only producing the bristle through injection molding (U.S. Pat. No.

3,256,545). This closest prior art is based on the realization that extruded bristles have ends of increased flexibility imparted to them by post-processing of the bristle ends as do bristles obtained through injection molding of one-piece brushes in consequence of the conicity required for injection molding, which have however disadvantageous effects with regard to wear resistance and durability. This patent method suggests improving the wear resistance, which decreases towards the ends, by enlarging the cross-section of the injected bristle, going from the end on the mounting side (the injection side bristle root) towards the free end. The cross-sectional shape may increase continuously or discontinuously. In any event, a larger amount of plastic material is present in the region of the working ends of the bristles than on the mounting side end. The insufficient properties of known conical bristles are compensated for through accumulation of a larger plastic mass in the region of the bristle ends. However, one has thereby overlooked the fact that, as the plastic mass or cross-section increases, the proportion of the energetically favorable balled structure increases, i.e. the bristle excessively looses bending elasticity due to the enlarged cross-section. This injection molding method proposes injection pressures of between 800 and 1200 bar (approximately $0.8 \cdot 10^5$ to $1.2 \cdot 10^5$ kPa), which are required to introduce the molten polymer mass through the channels, which are initially narrower on the injection side, into the extended channels such that they fill the mold. Despite the relatively high pressure, the recommended bristle diameters of unoriented molecular structures are between 1.6 and 2.2 mm in the region of the thinner cross-section and between 11 and 12 mm in the region of the thicker cross-section (column 5, lines 43 to 48 and column, lines 32 to 42). Support structures of the same molten polymer mass are formed on the injection side of the bristles, for mounting the injection-molded bristles to a bristle support, and interconnect several bristles, if required.

The technical literature also teaches (Ehrenstein: Eingenverstärkung von Thermoplasten im Schmelze-Deformationsprozeβ in the German magazine "Die Angewandte Makromolekulare Chemie" 175 (1990), pages 187 to 203) that for polyamides, only 3% and 6% and for polyethylene only 33% and 5.5% of the theoretical mechanical values for the modulus of elasticity [N/mm$^2$] and tensile strength [N/mm$^2$] respectively are obtained through extrusion and injection molding methods, wherein for injection-molded components, the tension-free state (molecular balled structure) is preferred.

It is the underlying object of the invention to produce bristles through injecting molding whose bending behavior and bend recovery is superior to that of extruded bristles, and which permits maximum attainment of the theoretical values of the modulus of elasticity and tensile strength to produce bristles of high quality through a large length range with relatively small cross-sections for simplified production of bristle geometries and bristle arrangements adjusted to the requirements of the final product such as brushes or paint brushes. The invention also concerns a device, which is suitable for carrying out the method.

SUMMARY OF THE INVENTION

Departing from the known injection molding method, wherein the molten polymer mass is injected under pressure into a bristle-molding channel of predetermined length and predetermined cross-sectional shape along this length, and the channel is vented during injection molding, this object is achieved in that the magnitude of the injection pressure is adjusted in dependence on the cross-sectional shape of the bristle-molding channel such that a shear flow of the molten polymer mass is generated with high core speed in the center of the molten polymer mass flow and large shearing effect due to wall friction under distinct longitudinal orientation of the polymer molecules, at least in the region of the molten polymer mass close to the wall, which is maintained along the channel, wherein the channel is simultaneously vented along its length to support maintenance of the shear flow.

The invention Is based on the realization that the bending behavior of a monofilament can be primarily increased through generation and maintenance of a molecular orientation which has previously not been realized in injection molding of bristles, brushes and paint brushes. The molecular structure in a molten polymer mass flow can only be substantially influenced using sufficiently narrow cross-sections and melt flow forced to a speed profile having strong shearing effects to deform and stretch the energetically most favorable tension-free balled structure. For this reason, in accordance with the invention, the injection pressure is set to a sufficiently high level that a steep flow profile forms in the bristle-molding channels which is characterized by a high core speed in the center of the flow and large shearing effect in its edge region due to the wall friction of the molten polymer mass on the channel wall, wherein the shearing forces due to wall friction are larger the higher the speed difference between neighboring flow layers. A flow profile of this type with high core speed moreover ensures perfect filling of the mold of the bristle-molding channel even for the narrowest of cross-sections (small bristle diameter) and large channel length (bristle length).

The speed profile can be set in dependence on the predetermined cross-sectional shape along the length of the bristle-molding channel through a correspondingly high, optionally variable injection pressure. The polymer molecules are thereby oriented longitudinally close to the channel wall and, to a reduced degree, within the entire melt flow, wherein the magnitude of the core speed moreover prevents premature solidification of the molten mass, even for small cross-sections and large lengths.

High pressure alone is not sufficient for rapid filling of a narrow molding channel. In accordance with the invention, the channel is vented along its length such that the shear flow with high flow speed is maintained up to the end of the channel and the desired longitudinal orientation of the molecules reaches the bristle tip.

Practical tests have shown that the injection pressure should be at least 500 bar ($0.5 \cdot 10^5$ kPa) and is a function of the cross-sectional dependence of the bristle-molding channel. For the quality bristles under discussion having an average bristle diameter of e.g. 0.3 (measured at half the length) and a corresponding cross-section of the bristle-molding channel and with a length of 10.5 mm, the desired speed profile can be produced with an injection pressure of at least 500 ($0.5 \cdot 10^5$ kPa). Approximately ⅔ of the above-mentioned injection pressure can usually be converted into specific pressure in the bristle-molding channel such that the molten polymer mass in the channel should have a pressure >300 bar ($0.3 \cdot 10^5$ kPa).

During solidification below the crystal melt temperature, thermoplastic materials form crystallites, which influence the modulus of elasticity (E module) and the tensile strength (tearing strength) in dependence on their shape and configuration. The formation of needle crystals has a positive influence on stiffness through increase of the E modulus and strength due to an increase of the tensile strength and initially requires linked elongated crystal seed formation on parallel molecular sections. This seed formation can be amplified compared to isothermal crystallization through the introduction of forces as given i.a. in flow processes. The inventive high injection pressure and the high flow velocity of the molten polymer mass in the bristle-molding channel obtained thereby therefore not only promote longitudinal molecular orientation but also crystal formation, wherein the high pressure simultaneously increases the packed density of the crystals through increased loading. The partial crystallization of the molecularly oriented molten mass increases the relaxation time, i.e. the molecular orientation lasts for a longer period.

The above-described effects are further supported in a supplement to the invention in which the bristle-molding channel is cooled.

The narrower the cross-section and the larger the length of the bristle-molding channel, the more reasonable it is to keep the channel walls warm to maintain the viscosity of the molten polymer mass and obtain complete filling of the mold. When setting the inventive method parameters, the filling of the mold is also guaranteed when the bristle-molding channel is cooled. Cooling of the channel and associated introduction of forces additionally promote formation of crystals and increase relaxation time. The stabilizing outer layer of the bristle, which is produced on the channel wall, permits increase of the post-pressure, which is common in injection molding. The higher the post-pressure, the stronger the crystal seed formation in the still molten bristle core. The pressure simultaneously increases the melting temperature and enhances cooling of the molten mass for a given mass temperature, thereby further producing a positive effect on the crystal growth speed and impeding relaxation of the molecules.

The high injection pressure and high flow velocity require particular or additional measures for rapid and effective venting to ensure complete mold filling and to prevent cavities in the molding channel or air inclusions in the molten mass. In the conventional injection molding methods, the bristle-molding channel is vented when the cavity is completely closed at the end of the channel or, for a longitudinally split injection mold defining the channel, in two planes parallel to the bristles. In the first case, for forming a perfect, preferably rounded bristle end, the venting must be drastically reduced to prevent molten polymer mass from getting into the venting regions. For venting parallel to the bristles, the mold-separating plane lies in the flow direction with the consequence that the molten polymer mass penetrates into even the most narrow of venting gaps and produces mold-separating seams along the bristle jacket.

The invention therefore proposes venting of the bristle-molding channel transverse to the flow direction of the molten polymer mass, wherein the venting is preferably effected in several planes transverse to the flow direction of the molten polymer mass. The number of venting planes is higher, the longer the bristle-molding channel such that, for predetermined channel length, the venting is controlled in dependence on the speed of the molten mass front. Since venting is possible in such a plane about the entire periphery of the bristle channel, there is a corresponding gap length transverse to the flow direction which is larger than that of a bristle-parallel mold-separating plane and which can be implemented over a plurality of planes.

The venting planes can be provided at equal separations along the length of the bristle-molding channel in dependence on the volume to be vented, optionally with progressive or degressive separation in the flow direction of the molten polymer mass. This permits simultaneous maintenance of a sufficiently high counter pressure in the channel to obtain uniform filling of the mold.

The bristle-molding channel can be vented merely through displacement of air through the flow pressure of the molten polymer mass. However, venting can also be supported by external underpressure.

The inventive method permits injection of the molten polymer mass into a bristle-molding channel from the injection side with a cross-section, which is substantially uniform to produce a substantially cylindrical bristle, which could not be produced with previous injection molding technology for bristles and brushes.

The cross-section may substantially continuously taper from the injection side to produce a bristle with preferably only weak conicity, which is desired for many applications to increase the bending elasticity from the bristle root to the bristle end. Such conicity promotes maintenance or even reinforces a steep velocity profile with high core speed and shearing effect in the edge region which increases along the length such that, despite increased flow resistance, the molecular orientation and crystal formation is enhanced towards the bristle end.

Injection molding produces precisely sized bristles with a tolerance of ±3% in cross-section and in length while extruded bristles with the same constructive parameters have tolerances of ±10%. The initially circular cross-section of extruded bristles is ovalized through processing which is unnecessary for the bristles produced according to the present invention.

Injection molding technology usually regards mold removal slopes of a few degrees (>1.00°) as necessary to be able to properly remove the injection-molded part. Mold removal is usually supported by ejectors. When the bristles are injection-molded in accordance with the above-mentioned prior art, the mold slope must be considerably larger to prevent tearing off of the bristle during removal from the mold (U.S. Pat. No. 3,256,545). This is one reason why prior art uses injection-molding tools, which have a bristle-parallel mold-separating plane, thereby accepting the above-described disadvantages. The inventive method permits reduction of the mold slope to a value of 0° with sufficient mold filling. Slender bristles of great length can be produced with relatively small conicity in the region of 0.2 to 0.5° when the positive-properties of a conical bristle are desired having a bending angle which increases towards the bristle end. Mold removal is simplified by crystal formation promoted by the longitudinal orientation and the associated increase in the tensile strength (tear resistance) of the bristle, in particular in the region close to the wall, which is important for removal from the mold. Further measures for facilitating removal from the mold are described in connection with the device.

In a further embodiment of the inventive method, the molten polymer mass is injected into an inlet region which narrows like a nozzle towards the bristle-molding channel for generating an extension flow to produce a bristle with a widened root region which optionally tapers continuously towards the actual bristle.

Such narrowing generates an extension flow, which produces considerable molecular orientation and, due to flow properties, corresponding boosting of the flow profile after the narrowing. The narrowing is therefore preferably disposed close to the injection side. It is also possible to provide narrowings along the length of the bristle-molding channel to obtain stepped bristles wherein, in this case as well, the narrowings have positive effects on the molecular structure and crystal formation.

After an optional upstream inlet region, the cross-section of the bristle-molding channel is preferably selected with a maximum width of ≦3 mm such that the injection-molded bristle has a corresponding diameter with an optionally broader root region. Bristles having this cross-section and broader root region cannot be produced through extrusion or spinning. The term "largest width" in this connection means that the bristle may also have a cross-section, which differs from a circular shape, e.g. oval, wherein the largest width of the length corresponds to the larger axis of the oval.

In applications of the inventive method, the ratio between the largest width and the length of the channel may be selected to be ≦1:5 to 1:1000, preferably up to ≦1:250. Bristles can e.g. be produced which have a length of between 15 mm and 750 mm with a maximum diameter of 3 mm in or close to the root region. The smaller the largest width, the shorter the length. For stringent requirements, e.g. for toothbrushes, application brushes etc. diameters above the root region of ≦0.5 mm are recommended which permit bristle lengths of more than 60 mm in the inventive method.

The inventive method can be modified in a likewise advantageous fashion when the molten polymer mass is injected simultaneously into several neighboring bristle-molding channels thereby forming a corresponding number of bristles such that a set of bristles can be produced in one injection process. Minimizing of the separation of the bristle-molding channels produces bristle arrangements in the form of pucks through slight compacting of the removed bristles.

The number and arrangement of the bristle-molding channels can be selected such that the entire bristle stock of a brush or of a paint brush is produced in one injection process, wherein the separations between the bristles and their geometrical relationships can be varied in accordance with the desired arrangement in the bristle stock.

A further embodiment provides that the molten polymer mass is injected into the neighboring bristle-molding channels thereby simultaneously forming a connection between at least two bristles, wherein the connection may serve for further handling of the connected bristles and also as an aid for connection to a brush body, paint brush handle or the like. Alternatively, after injection of the bristles from a polymer, a molten polymer mass of another polymer can be subsequently injected to produce a connection between the bristles. The connection may be in the form of bars, grids connecting several bristles; or the like. The use of different polymers with a joining factor of ≧20% guarantees sufficiently secure connection.

The connection may further be designed such that it forms a bristle support which may simultaneously constitute the brush body or part thereof or which can be completed into a brush body or paint brush handle by injecting at least one further molten polymer mass which may comprise a different thermoplastic or thermoelastic polymer.

In a further variant of the method, several bristles can be injected with different lengths such that, in combination with the bristle support connecting them, a complete bristle stock or partial stock can be produced for a brush or a paint brush, wherein the bristle ends are at different heights along a flat or non-planar envelope surface so that the finished brush has optimized bristle end contours.

The bristle group can also be injected with different cross-sections to permit different effects in predetermined regions of a finished brush.

Likewise, the bristle group can be injected with a cross-sectional shape, which differs along its length. The bristle group can also be injected in a mutually non-parallel fashion to produce a bristle stock with differing bristle orientations.

In accordance with another embodiment of the method, bristles having the same geometry but different bending elasticity (hardness) can be generated through injection molding of different molten polymer masses in the same molding channels. For extruded bristles-for brushes having different degrees of hardness (textures) e.g. for toothbrushes having hardness gradations of soft, medium, hard, the desired degree of hardness could be influenced only via the diameter of the bristle, i.e. toothbrushes of the same structure had to prepare and process up to three different bristle diameters. The inventive method realizes these degrees of hardness merely through selection of the polymer and optionally by adjustment of the injection pressure but with identical bristle diameters.

Bristles can also be injected from a polymer or a polymer mixture, which have reduced secondary binding forces in the solidified state. These bristles can be cleaved after production through mechanical forces thereby forming flags, if necessary only after further processing into brushes or paintbrushes.

The bristles can be injected from a polymer comprising additives, which become active during use. The additives may have mechanical, e.g. abrasive effect or, e.g. for toothbrush bristles, be additives with protective, therapeutical or remineralizing action. Numerous additives of this type are known.

The invention also concerns a device for injection-molding bristles from thermoplastic polymers, comprising a means for producing the injection pressure and an injection mold which has at least one supply channel for the molten polymer mass and at least one cavity in the form of a molding channel with a mold contour which corresponds to the length and cross-sectional shape of the bristle to be produced, wherein the molding channel has associated venting means for releasing the air displaced during injection molding. Devices of this kind are known from the above-described prior art.

A device of this type is characterized, in accordance with the invention, by means for generating an injection pressure of preferably at least 500 bar ($0.5 \cdot 10^5$ kPa) and the venting means have venting cross-sections which are distributed along the length of the molding channel and which are designed to form, in cooperation with the injection pressure, a shear flow with high core speed in the center of the molten polymer mass and large shearing effect on the wall of the molding channel.

Such a device can produce bristles through injection molding as described in connection with the method. Compared to known injection molding devices for producing bristles or one-piece brushes with bristles, the device according to the invention is designed such that the desired flow dynamics is obtained in the channel forming the bristle.

The means for generating the injection pressure is preferably designed such that injection pressures of between 500 and 4000 bar ($0.5 \cdot 10^5$ to $4 \cdot 10^5$ kPa) can be set depending on the length and cross-sectional shape of the molding channel. The pressure is higher, the smaller the cross-section of the bristle to be produced and the greater its length.

The means for generating the injection pressure and venting cross-sections on the molding channel are designed with respect to construction and control such that the molten polymer mass in the molding channel has a specific pressure of at least 300 bar ($0.3 \cdot 10^5$ kPa) to 1300 bar ($1.3 \cdot 10^5$ kPa). This design is adjusted to the mass flow and flow resistances to be overcome upstream of the molding channel.

If the injection pressure on the generating means is sufficiently high, the injection pressure can advantageously be controlled depending on the length and the cross-sectional shape of the molding channel to permit injection of injection molds of different geometrical shapes with one injection-molding unit.

This purpose is supported in that the venting means have venting cross-sections, which can be controlled depending on the specific pressure.

In the inventive device, the injection mold is advantageously associated with coolant, which may be external cooling after each injection molding cycle or after removal from the mold. The molding channel in the injection mold may have associated cooling means for keeping the molding channel at a reduced temperature.

In a particularly preferred embodiment of the invention, the injection mold consists of several molding plates disposed in layers transverse to the longitudinal extension of the molding channel, each of which defines a longitudinal section of the molding channel.

In contrast to prior art with more or less block-shaped injection molds, the invention provides a structure of stacked molding plates. This structure permits forming of minimum bore cross-sections with high precision in each molding plate of low thickness. This and any other production technology would fail for larger bore depths. This is also a reason why longitudinally separated injection molds were necessary for the production of narrow cross-sections. Their disadvantages are described in connection with prior art. The inventive decomposition of the injection mold into several plates permits realization of molding channels of large length with high and reproducible precision over the entire length. The molding plates which comprise the end of the molding channels and form the bristle end can have, due to the small thickness of the molding plates, cavities with only small depth to form a bristle end having clear contours, without any mold separating seam, and without additional venting means. Oxidation of the polymer, which can be observed in narrow mold cross-sections through the so-called diesel effect, does not occur due to the small depth of the cavity.

The layered structure of the injection mold moreover permits formation of the venting means on the molding plates, i.e. with a frequency corresponding to their number. The venting means are preferably formed between the mutually facing support surfaces of the molding plates e.g. through narrow gaps or channels. The high flow velocity of the molten polymer mass perpendicular to such narrow gaps or channels prevents the molten mass from penetrating into the venting openings, despite the high pressure. The venting openings may therefore be larger than in a two-shell mold whose mold-separating plane is in the flow direction of the molten mass. The venting cross-sections may be formed with a maximum width of only a few μm up to 300 μm.

The venting means are preferably formed completely or partially through surface roughnesses on the mutually facing surfaces of the molding plates.

In a further advantageous embodiment, the venting means have venting cross-sections which increase outwardly from the surface of the molding channel such that the air can freely escape after passage of the narrowest point of the venting cross-sections.

The displacement of air caused by the specific pressure in the molding channel can be supported when the venting means is connected to an external underpressure source.

The device may be designed such that the molding channel has a cross-section which is substantially constant along its length or which substantially uniformly tapers towards its end to produce cylindrical or slightly conical bristles.

Practical injection tests under the stated method conditions have shown that the molding channel can taper at an angle <1.0°, with linear axis, to produce sufficient mold slope for removing a slightly conical bristle, having excellent bending behavior, from the mold.

The molding channel can have a cross-section, which discontinuously tapers towards the end to produce specially designed bristle ends as required by the application for the finished brush.

The largest width of the cross-section of the molding channel is preferably ≦3 mm. This covers the bristle cross-sections desired for quality brushes and paintbrushes.

At least one molding plate can be disposed on the injection side having a widening which tapers towards the molding channel and can be connected upstream of the molding plates defining the molding channel having the above-mentioned largest width at their sides facing the supply channel to reinforce the cross-section on the bristle root and on the bristle base and also to obtain, due to this widening, an extensional flow at the inlet region of the molding channel to support formation of the desired flow dynamics. The widening can narrow like a trumpet towards the molding channel to produce a smoothly connecting shoulder at the bristle and to the support connecting the bristles, brush body or the like. This is particularly important for hygiene brushes of any type.

The ratio between the largest width of the cross-section of the molding channel and its length is preferably between 1:5 and 1:250 but may also be 1:1000 wherein the ratio is closer to the higher value the narrower the cross-section of the molding channel and closer to the lower value the larger the narrowest cross-section.

A further embodiment of the invention provides that the number and thickness of the molding plates is matched to the length of the molding channel, wherein the number of the molding plates is inversely proportional to the ratio between the largest inner diameter of the cross-section and the length of the molding channel. The number of molding plates, which belong to an injection mold, can be variable to be able to produce bristles of varying length with the same mold.

The molding plates preferably have a thickness, which is approximately three to fifteen times the central diameter of the molding channel. For a bristle of an average diameter of 0.3 mm and a length of 10.5 mm, the molding plates have e.g. a thickness of 1.5 mm to 2.00 mm. A longitudinal section of the molding channel of 1.5 mm to 2.0 mm can be drilled with high precision into the molding plate.

The molding plates are movable perpendicular to their plate plane, individually or in groups. This permits, in particular, removal of the bristle from the mold in a non-conventional fashion, wherein e.g. the molding plates, starting with the molding plate having the mold contour at the end of the molding channel and ending with the molding plate facing the supply channel, can be subsequently removed either individually or in groups.

The molding plates are reliably kept together under the method-specific high closing pressure of the injection-molding machine and are not subjected to any deforming forces, despite their low thickness. Moreover, the venting openings are kept closed by the closing pressure and, unlike channels with longitudinal venting, require no additional means to keep them closed.

Practical tests have shown that the inventive narrow cross-sections and channel lengths require considerable extraction forces to release the bristles if e.g. only two molding plates are present. The bristle usually breaks. Increasing the number of plates and their successive separation from each other permits damage-free removal of the bristle from the mold, in particular when the molding plate facing the supply channel is removed last. During removal from the mold, the edges of the holes of each molding plate function as drawing nozzles to flatten any "polymer skin" formed in the mold-separating plane without disadvantageously effecting the bristle jacket. In any event, the bristle ends are perfectly formed.

Individual molding plates may be displaceable parallel to the neighboring molding plates to exert transverse loading on the bristle after injection molding, thereby optimizing the molecular structure.

In a further preferred embodiment, the injection mold has molding channels of different length and/or different cross-sectional shape to obtain e.g. a bristle stock of the desired geometry and configuration in one injection molding cycle.

In accordance with a further embodiment, the injection mold has molding channels comprising a central axis which extends at an inclined angle relative to the direction of motion of the molding plates, wherein each molding plate comprises a longitudinal section of the molding channel with a length which permits removal from the mold through successive removal of the individual molding plates, despite the angle variation.

The subdivision of the injection mold into a plurality of molding plates extending transverse to the molding channel permits subdivision of the molding channel into longitudinal sections which nevertheless permit removal of the individual longitudinal sections from the mold without excessive strain on the bristle or deformation thereof even when the bristle axis is inclined relative to the direction of motion of the molding plates (removing direction). In this fashion, bristle groups can be produced in one single injection mold, wherein the bristles extend parallel to each other but at an angle relative to a bristle support connecting them or which have different angle orientations relative to each other.

In accordance with a further embodiment, the injection mold has molding channels with a central axis which is curved relative to the direction of motion of the molding plates, wherein each molding plate defines a longitudinal section of the molding channel which is dimensioned such that removal form the mold is possible through successive lifting of individual molding plates in dependence on the curvature.

Wavy bristles can thereby be produced which can also be easily removed from the mold. It is also possible to simultaneously produce straight, wavy and curved bristles in one single injection mold.

In a further embodiment, the injection mold has at least one molding plate which can be displaced in its plane relative to the neighboring molding plates after injection-molding of the bristles to form, together with these, a clamping means for all the bristles which acts on the corresponding portion of the length of the molding channel.

The invention thereby permits use of parts of the injection mold to grasp the injected bristles and fix them in the injection mold along a portion of their length e.g. to separate the molding plates close to the ends, in the removal direction, from the remaining molding plates and to carry along the bristle blanks such that the bristles are exposed along a middle partial length, i.e. between these molding plates and the remaining molding plates. Subsequent displacement of the clamping molding plates and return of the molding plates close to the end in the direction towards the injection end of the bristles, causes these ends to project past the molding plate at the injection side. Through transfer of the injection mold, optionally under further clamping by the holder, the injection mold can be connected to another injection molding tool, which has a mold cavity forming a bristle support or brush body. In a further injection molding process, the projecting ends are surrounded by a further molten polymer mass, which fills this mold cavity.

The clamping means may also serve as a transport holder to transfer the clamped bristles, after removal from the other molding plates, into another work station for connection to a brush body. This is also possible when the bristles are already joined via a connection such as e.g. bridges, grids or bristle supports. The clamping molding plate is then located close to the transition between bristles and bristle support and the holder is removed in the removal direction along with the connection and subsequently transferred, wherein the molding plates which serve as holders are replaced by an equivalent set of molding plates to again obtain a complete injection mold. The holder can be a portable holder moving in a circulating path and be reused after complete removal of the bristles from the holder to complement the injection mold. If the connection is not directly required for the subsequent fabrication steps, e.g. insertion, gluing, welding, injecting etc. it can also be removed and only the bristles may be connected to the bristle support or brush body using any conventional joining technique.

A further embodiment of the invention provides that the injection mold consists of at least two groups of molding plates comprising clamping means of which the first group comprises part of the molding channel including the end and the further groups comprise the remaining part of the molding channel, wherein the first group can be removed from the second group and the subsequent groups can be removed from each other, in temporal sequence. The injection process is divided into a number of injection molding cycles corresponding to the number of groups such that, in the closed initial position of the injection mold, the molten polymer mass is injected in a first injection cycle into the complete molding channel, whereupon the first group can be removed from the further groups thereby carrying along the blank via the clamping means, with the withdrawal path being shorter than the length of the blank. Subsequently, in a second injection molding cycle, more molten polymer mass is injected into the released longitudinal section of the molding channel of the further groups and the steps injection/removal are repeated until the second to last group is removed from the last group to produce bristles of a length greater than the length of the molding channel. The bristle is produced in sections, which permits production of bristles of greater lengths.

In this embodiment of the device, a different molten polymer mass can be injected in each injection cycle to produce a bristle which has several components along the bristle length, wherein the polymers used in each step can be matched to the requirements of the bristle and connection to the bristle support thereby producing a bristle with several regions. The removal motions of the individual groups can be matched, in short time intervals, to the injection molding cycle, wherein the blank is sufficiently cooled that it is removed from the remaining molding plates during the withdrawal motion. The individual regions are preferably bonded together but may also be connected in a positive or non-positive manner through corresponding profiling of the end of the last injected partial length.

The molding plate comprising the bristle end and the mold contour at the end of the molding channel can preferably be replaced with a molding plate having a different mold contour for producing bristles with ends of different shapes. This molding plate should only have smooth contours to permit faultless removal from the mold of the bristle end, which is important for the respective use.

In this fashion, the end contour of the bristles can be varied for otherwise constant geometry of the bristles, e.g. have pointed or variably rounded ends or even to produce bristles with forked-ends (two tips or the like). This molding plate may have longitudinal molding channel sections of different depths to form a contoured envelope surface for the bristle ends of a bristle stock.

A mold cavity, which connects two or more molding channels, is preferably disposed between the supply channel and the molding channels of the injection mold for forming a connection among the bristles which can optionally also connect all bristles. It can serve either as an auxiliary means for further handling of the entire bristle stock or as an auxiliary means for completing the bristle stock with a brush body.

The mold cavity can also be designed to produce a brush or paintbrush body or part thereof.

In particular, the mold cavity can thereby be formed from different polymers for producing a brush or paintbrush body or part thereof in a multiple component design.

BRIEF DESCRIPTION OF THE DRAWING

The invention is described below by means of diagrams and embodiments.

FIG. 7 shows a schematic view of a conical bristle on a scale of 2:1 with dimensions;

FIG. 8 shows a schematic view of a conical bristle on a scale of 1:5 with dimensions;

FIGS. 16 through 20 each show a schematic longitudinal section of a modified embodiment of an injection mold in different operating phases;

DESCRIPTION OF THE PREFERRED EMBODIMENT

Figure 1:
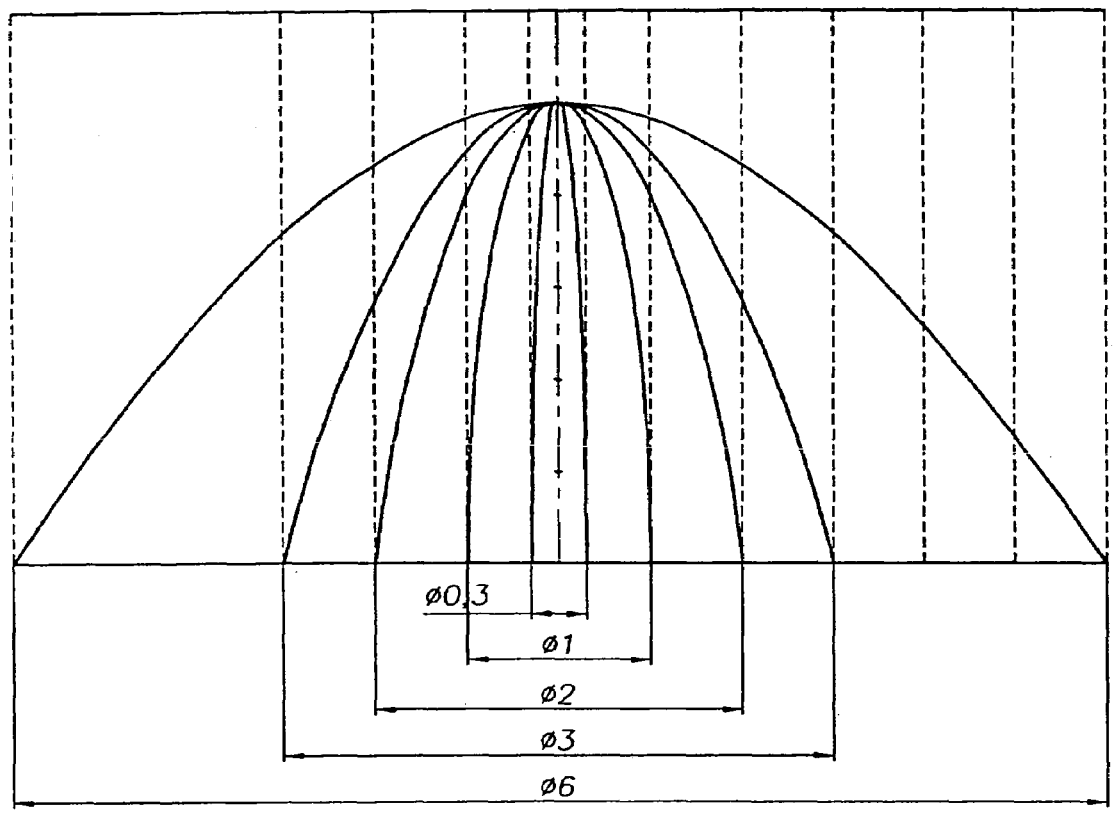
FIG. 1 shows a diagram of the speed profile in molding channels of different diameters.

FIG. 1 schematically shows the flow profile (speed profile) in bristle-molding channels of different diameters. The walls of the channels are indicated with broken vertical lines and the associated diameters are given in (mm) below the diagram. The smallest bristle-molding channel has a diameter of 0.3 mm, the largest has a diameter of 6 mm. A constant flow speed in the center of the channel (core speed) leads to the illustrated flow profiles in dependence on the channel diameter (bristle diameter) which have, in rough approximation, a parabolic dependence. If the diameter of the molding channel remains constant along its length, the flow profile does not change its shape or does so only slightly.

Figures 2, 3, 4, 5:
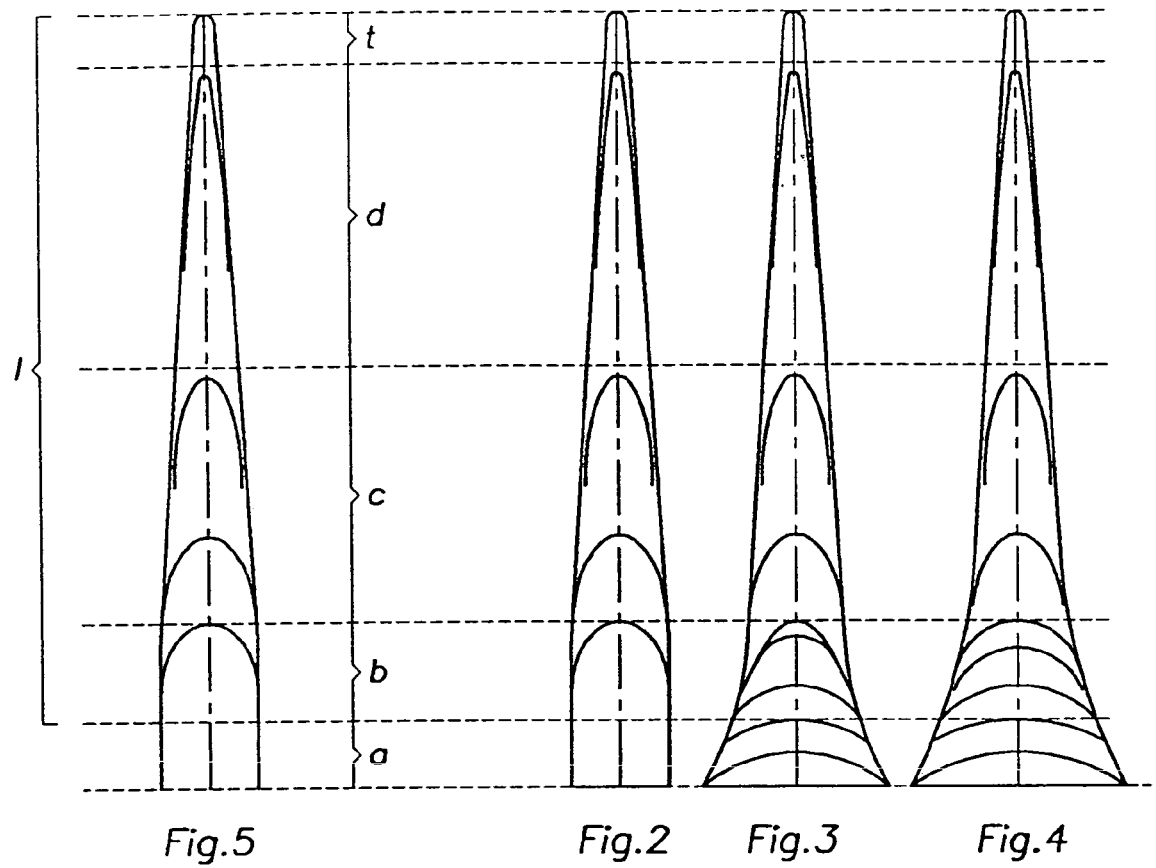
FIGS. 2 to 4 each show a schematic view of an embodiment of the molding channel with the respective speed profiles.
FIG. 5 shows a schematic view of a bristle injection-molded in a molding channel of FIG. 2 with the speed profiles essential for the longitudinal orientation.

If the molding channels have a weak conical shape, as schematically shown in FIGS. 2 through 4, the core speed can even be increased for constant pressure and a strong shearing effect can be produced by the wall friction in the region close to the wall. If such a molding channel is loaded with molten polymer mass during injection molding, the molecules experience a strong longitudinal orientation in the wall region due to the shearing effect while the molecules in the molten mass which is not subjected to loads have their energetically most favorable, balled structure. For molten polymer mass injected in the molding channel under corresponding high pressure, this leads to a strengthening of the produced bristle in the region close to the wall which extends to the bristle end for sufficiently high core speeds, with the molecular orientation decreasing towards the center. The molecular orientation due to shear flow with strong shearing effect in the region close to the wall is also accompanied by tension-induced crystal formation, wherein the strong shearing effect in the edge region promotes formation of long needle crystals. Moreover, use of high injection pressure has a favorable effect on the seed formation and the crystal density. With a specific injection pressure in the molding channel >300 bar ($0.3 \cdot 10^5$ kPa), preferably >1300 bar ($1.3 \cdot 10^5$ kPa), the modulus of elasticity and therefore the bending elasticity can be considerably improved when the forming channel is sufficiently vented, thereby increasing the tear resistance (tensile strength). This specific pressure requires an injection pressure of >500 bar ($0.5 \cdot 10^5$ kPa) from the pressure-generating means.

A bristle in accordance with FIG. 5, produced in a molding channel of FIG. 2 has a relatively stiff root region a and a bending elasticity along its free length l, which increases towards the bristle end as well as high tensile strength. While the root region a serves mainly for connection to or embedding in a bristle support or brush body, the bristle has, along its free length l, a stem section which consists of a stem base b and the actual stem c. Reduction of the cross-section in the regions b and c, which is essential for the bending deflection, is compensated for through increase in the bending elasticity due to the above-described effects. The stem region b, c is joined by the actual effective region d, i.e. the region important for the brushing effect which forms, together with the tip region t, the region which determines the flexibility of the bristle. The tip region and its shaping determine the direct surface effect of the bristle, the penetration depth into the surface irregularities etc. In contrast to FIG. 2, the bristle can have a trumpet-shaped root region of greater or lesser distinction when a widening is connected upstream of the actual molding channel as shown in FIGS. 3 and 4.

Figure 6:
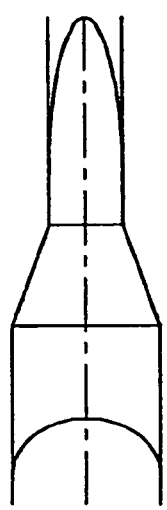
FIG. 6 shows a schematic view of a constriction in a molding channel with an extension flow.

The stabilizing effects can be further improved and, in particular, also obtained for short bristle lengths when a discontinuous constriction is provided on the inlet side of the molten polymer mass before transfer into the actual bristle-molding channel (see FIG. 6). An extension flow is formed at the constriction, which produces a high core speed along a short path with large shearing effect in the region close to the wall.

The inventive operating parameters for injection pressure and the achievable high core speeds with large shearing effect through wall friction produce thin bristles of adjustable length using injection molding, which has not been possible up to now, not even with extrusion of endless monofilaments, wherein even weak conicity of bristles of such endless monofilaments can be realized only through considerable technical effort (interval withdrawal). FIGS. 7 and 8 show two embodiments. FIG. 7 shows (scale 2:1) a bristle of a diameter of 0.77 mm in the root region and 0.2 mm at the bristle end, which has an average diameter of 0.49 mm at half-length. With an extremely weak conicity angle of 0.27°, which corresponds to the mold slope of the bristle-molding channel, bristles of a length of 60 mm or more can be injection-molded as are required e.g. for high-quality paint brushes or the like. They have an average diameter at half bristle length of approximately 0.5 mm. FIG. 8 shows (scale 5:1) a bristle of a diameter of 0.35 mm in the root region and of 0.25 mm at the bristle end with a bristle length of 10.5 mm and the same conical angle (mold slope). The average diameter is 0.3 mm. Bristles of this type are suited e.g. for toothbrushes. Due to the slender geometry of such bristles, they can be densely arranged without producing excessive separation in the region of the bristle ends—in contrast to conventional injection-molded bristles.

Figure 9:
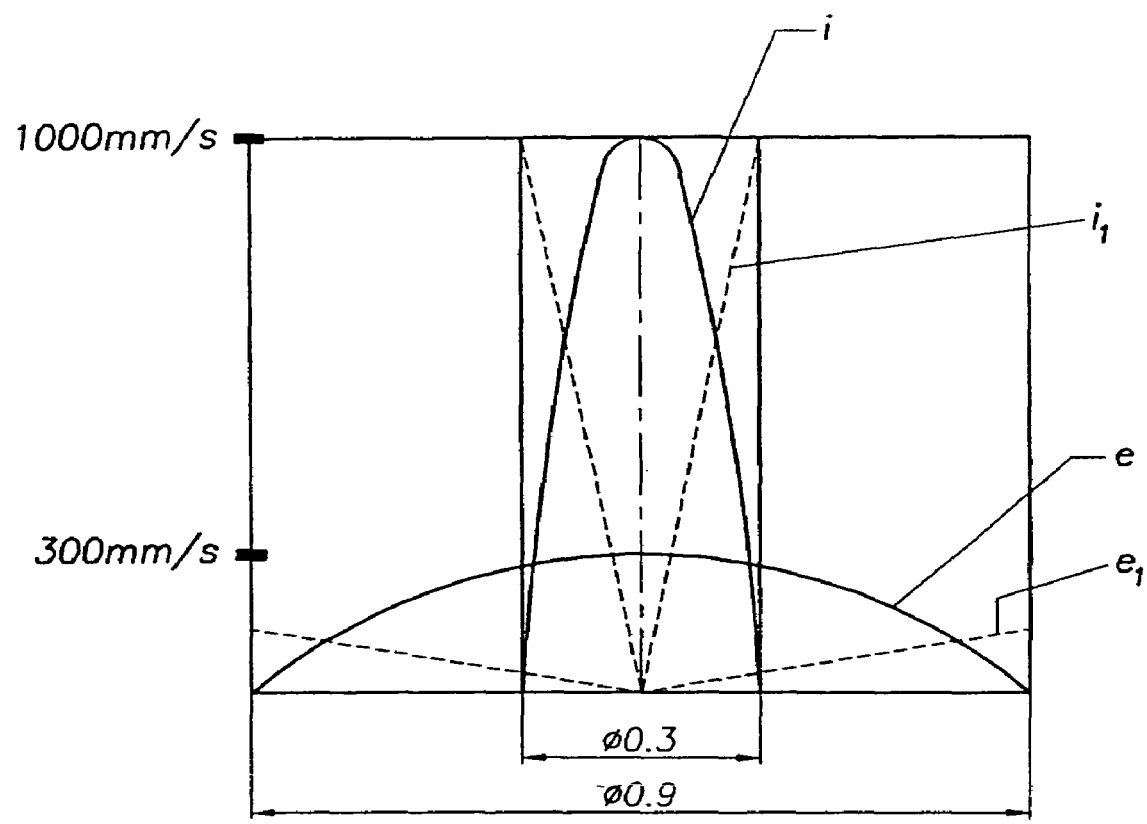
FIG. 9 shows a comparative schematic representation of the speed profiles in an extrusion nozzle and in a molding channel.
Figure 10:
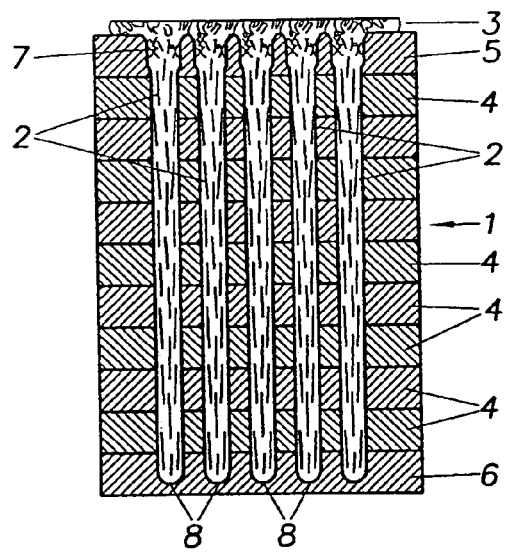
FIGS. 10 through 13 each show a schematic longitudinal section through an embodiment of an injection mold in different operating phases.

FIG. 9 shows the superiority in terms of technical properties and applications, of the bristle produced according to the invention compared to a bristle produced by extrusion.

During extrusion spinning of a monofilament for producing a bristle of an average diameter of 0.3 mm, the spinning nozzle has an outlet diameter of 0.9 mm (outer vertical lines in FIG. 9). The molten polymer mass has a maximum flow speed (core speed) inside the nozzle of typically approximately 300 mm/s, which is determined by the extrusion pressure and the withdrawal speed of the monofilament. The monofilament, which leaves the nozzle, is drawn along a short path, by means of the withdrawal forces, to a diameter of between 0.9 and 0.3 mm and cooled directly thereafter to fix the molecular structure. During subsequent drawing, the monofilament is given its final diameter of 0.3 mm with a diameter tolerance of approximately ±10%. The speed profile is designated as e (extrusion) in FIG. 9.

In the inventive injection molding, the bristle-molding channel has an average diameter of 0.3 mm (the two inner vertical boundary lines in FIG. 9). An injection pressure in the region of 2000 bar ($2 \cdot 10^5$ kPa) produces a core speed of approximately 1000 mm/s in the channel. The speed profile is designated as i (injection). The shearing effect in the flow, in particular in the region close to the wall is relevant for the intrinsic strength of the thermoplastic polymer, which is determined by the shearing rate (shearing moment) γ. The shearing rate y across the radius r of the flow channel depends on the derivative of the speed profile with respect to the radius r $$\gamma(r) = |dv(r)/dr| = \frac{2v_{max}}{R^2} \cdot r$$

which is inversely proportional to the square of the effective diameter of the flow channel. The shearing rate is linearly proportional to the maximum flow speed (core speed). In the above-described example shearing rates for the injected bristle are produced which exceed the stated extrusion flow by at least a factor of 10.

The broken lines in FIG. 9 illustrate the shearing rates without scaling for extrusion ($e_1$) and for injection molding ($i_1$). They have respective maxima at the walls of the nozzle of the bristle-molding channel.

FIGS. 10 to 13 schematically show an embodiment of an injection mold in different operational phases which is particularly suited for injection molding of the bristles according to the inventive method. The scale is highly enlarged to show the details more clearly.

The injection mold 1 has several long parallel molding channels 2 which are joined to an injection molding means via a supply channel 3. The injection molding means is designed to produce injection pressures in the region of 500 bar ($0.5 \cdot 10^5$ kPa), preferably >2000 bar ($2 \cdot 10^5$ kPa). The exact magnitude of the injection pressure is set in dependence on the cross-sectional shape of the molding channel 2 along its length and in dependence on the length itself such that a specific pressure >300 bar ($0.3 \cdot 10^5$ kPa) occurs in the molding channel.

The injection mold consists of a plurality of layered molding plates 4 of substantially identical thicknesses, of a molding plate 5 on the injection side, and a molding plate 6 forming the bristle ends. Each molding plate 4, 5 and 6 generates one longitudinal section of the molding channel 2, which is preferably produced by bore holes.

The molding plate 5 has openings 7 on the injection side which narrow towards the molding channel 2 to produce e.g. the extension flow of FIG. 6 and form the root region a (FIG. 5) of the bristle. The subsequent longitudinal sections of the molding channel in the molding plates 4 have a cylindrical or slightly conical cross-sectional shape along their length while the molding plate 6 forming the bristle ends has blind holes 8 which are dome-shaped in the embodiment shown.

During injection molding, the molten polymer mass enters into the narrowing openings 7 of the molding plate 5 via the supply channel 3 and, due to the high core speed, fills the entire molding channel up to the plate 6 forming the ends. The molten polymer mass has a substantially unordered, balled molecular structure in the supply channel 3 which is transformed into a longitudinal molecular structure in the opening 7 on the injection side and subsequent molding channel 2 due to the strong shear flow.

The molding plates 4, 5 and 6 can be moved perpendicular to the plane of the plate to release the injection-molded bristles when they have achieved sufficient shape stability. The injection molding tool 1 is preferably cooled such that the wall of the molding channels 2 remains relatively cold, thereby supporting the formation of crystals in the molten polymer mass.

Figure 11:
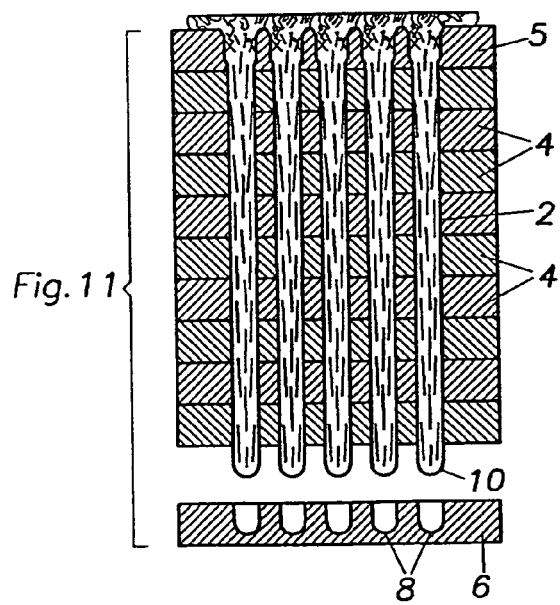
Figure 12:
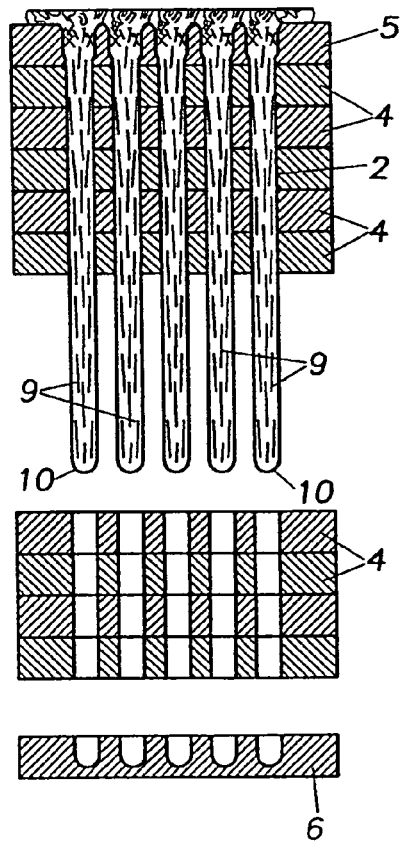
Figure 13:
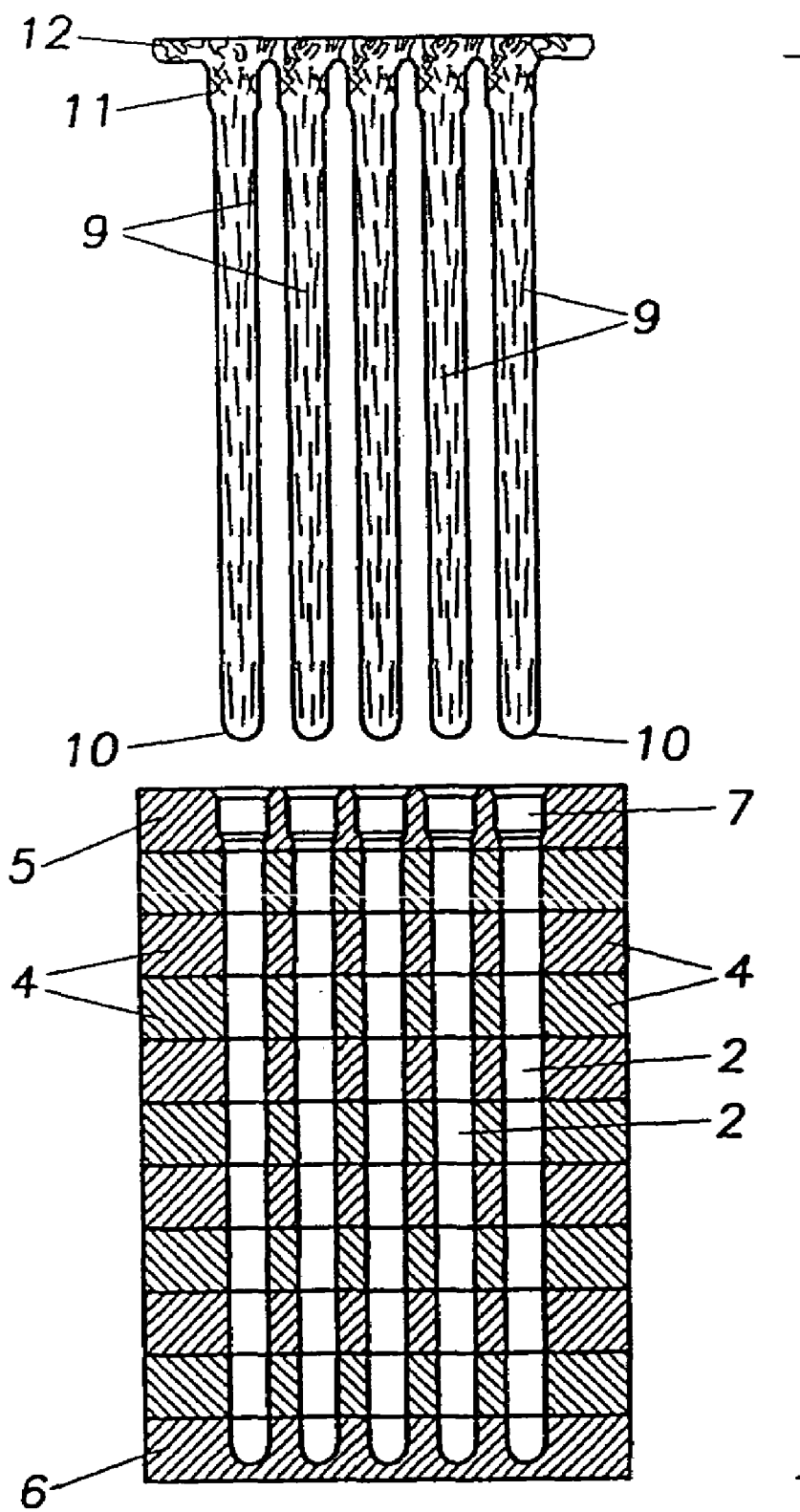

To release the bristles from the mold, the molding plate 6 is initially removed (FIG. 11). Only very small adhesive forces must be overcome thereby ensuring that the bristle ends, which are particularly important for later use of a brush or a paintbrush, maintain their shapes. The molding plates 4 are subsequently removed individually or in groups (FIG. 12) until the ends 10 of the bristles 9 are released along most of their length. During these releasing steps, the bristles are retained by means of the molding plate 5 on the injection side and this molding plate 5 is also subsequently removed to expose all bristles 9 with their slightly thickened root region 11 (FIG. 13). The molten polymer mass in the supply channel on the injection side also effects a connection 12 among all bristles 9 and the overall blank can be removed and finished into a brush, a paint brush or the like, wherein the connection is either integrated into the structure or only serves as auxiliary means for handling the bristles and is separated off before connecting the bristles to a brush body or the like.

Figure 14:
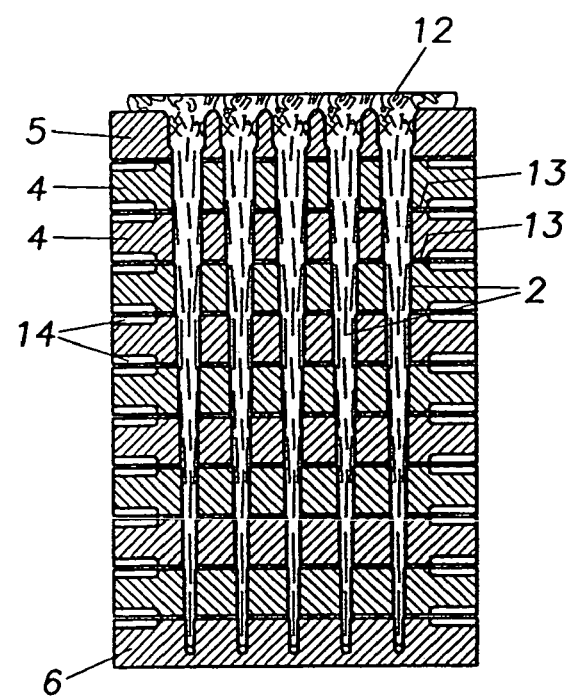
FIG. 14 shows a schematic longitudinal-section through a further embodiment of the injection mold.

Optimum venting of the molding channels must be provided during injection molding to facilitate the desired high core speed. FIG. 14 shows an embodiment thereof. Venting occurs via narrow gaps 13 between the molding plates 4, 5 and 6 so that the air is removed along the entire length of the molding channels 2 as the front advances. Instead of narrow gaps 13, it is also possible to roughen the mutually facing surfaces of the molding plates 4, 5 and 6, to obtain overall venting cross-sections of sufficient size. The venting cross-sections have widenings 14 towards the outside to permit rapid escape of the exhausting air.

Figure 15:
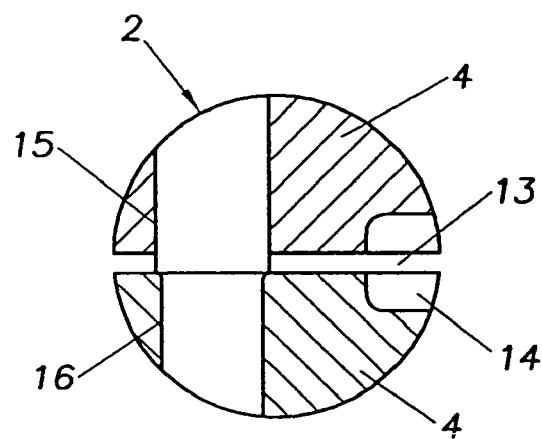
FIG. 15 shows an enlarged detail of the injection mold of FIG. 14 in the region of an externally disposed molding channel.

The molding channels 2 may taper along their entire length with a mold slope <1.0°, wherein the tapering is not dictated by release from the mold but rather by the desired bristle shape and its bending behavior. The cross-sectional shape of the molding channels 2 must not be continuously conical (see the enlarged scale of FIG. 15 illustrating the venting geometry). The upper molding plate 4 in the drawing indicates a cylindrical longitudinal section 15 and the lower molding plate 4 a cylindrical longitudinal section 16 for the molding channel 2. The cross-section of the two molding plates 4 tapers from the longitudinal section 15 to the longitudinal section 16 of the molding channel 2 by a few μm to produce a weak step at this point. At this step region, venting takes place via the gap 13 between the two molding plates, which map into a widening 14. During release from the mold, these unnoticeable steps are not visible and produce slight conicity along the entire length of the bristle. The longitudinal sections 15, 16 in the individual molding plates 4 can be produced through simple drilling. Alternatively, the longitudinal sections of the individual molding plates can have identical diameters to produce a cylindrical bristle. More distinct diameter changes produce stepped bristles.

Conical bristles are technically advantageous for injection molding and for removal from the mold. The smallest cross-section at the bristle end cools more rapidly than the subsequent regions of the bristle towards the root region and the step-by-step release from the bristle end to the bristle root follows the temperature gradient in the bristle.

The molding plates 4 have a thickness of a few millimeters. It may correspond approximately to three to fifteen times the diameter of the molding channel 2 so that extremely precise drilling of the longitudinal sections in the individual molding plates is possible. Since they are kept adjacent to one another under the closing pressure of the injection-molding machine, even these thin molding plates maintain their dimensions and shape, despite the high injection pressure. The low thickness also ensures good thermal dissipation, since the molding plates are evenly insulated by the venting gaps. They are easy to cool for the same reason, e.g. using external coolants, which can be particularly effective when the mold is closed, and also during the time between opening and renewed closing. Effective cooling already occurs via the surrounding air due to exposure of the molding plates and in consequence of their small thickness. Alternatively, the cooling means may be integrated in or between the molding plates. Finally, the minimal loading under injection pressure permits production of the molding plates from materials having good thermal conductivity with less stringent mechanical strength properties than steel or the like.

The influence of effective cooling on the molecular structure of the bristles has already been discussed above.

FIG. 16 also schematically shows an injection mold 1 which consists of layered molding plates 4, wherein the molding plate on the injection side does not have widened cross-sections. In contrast to the above-described embodiments, the molding plates 4 are divided into two groups 17, 18 (see FIG. 17) wherein each group comprises at least one molding plate which can be transversely displaced (indicated in FIGS. 17 to 20 with double arrows 19, 20.)

The transversely displaceable molding plates cooperate with the neighboring molding plates to clamp the blanks 21, which, in this embodiment, only form one portion (longitudinal section) of the final bristle. The blank 21 is injected from a thermoplastic polymer with injection parameters matched to this longitudinal section of the finished bristle. After the injection cycle, at least one displaceable plate of the group 18 of molding plates 4 (FIG. 17) is brought into a clamping position and the blanks 21 are carried along when the group 18 is removed to be thereby partially released from the molding plates 4 of the group 17 on the injection side and free a predetermined longitudinal section 22 of the molding channels in the molding plates 4 of the group 17. At the end of the blank 21, profilings may be optionally formed as indicated in the drawing. After withdrawal of the molding plates 4 of the group 18, the displaceable molding plate in the group 17 is brought into the clamping position and the exposed longitudinal sections 22 are subsequently filled with a molten polymer mass, which consists of another polymer or a polymer with other additives. The longitudinal sections 23 of the bristle which are formed thereby connect to the blanks 21 through material bonding and/or positive locking. Subsequently, the displaceable forming plate in group 17 is returned to its initial position and the blanks 21 with molded-on longitudinal sections 23 are again partially withdrawn from the molding channels of the group 17 when the clamping means is closed to expose longitudinal sections 24 in the molding channels. In a further injection molding cycle, the longitudinal sections 24 are filled with a further molten polymer mass with optionally further differentiated properties to finally obtain bristles 27 having three regions (sections 21, 23 and 25) for different mechanical strength properties and/or different usage properties along the bristle length. In particular, the region 21, which encloses the bristle end, can serve as wear display to show the degree of wear of the bristle. Final release of the bristles from the mold is carried out as described above.

FIGS. 21 to 24 also show an injection mold 1 (FIG. 21) which consists of two groups 17, 18 of molding plates 4 each of which has at least one transversely displaceable molding plate to form a clamping means. In contrast to the above-described embodiment, the molding plate 5 on the injection side has widenings, which taper towards the molding channel.

The molding plate 6 forming the bristle ends has blind holes 28, 29 and 30 of different depths with dome-shaped hole bottoms such that a plurality of bristles of different lengths can be produced whose ends lie on a curved envelope surface.

Figure 21:
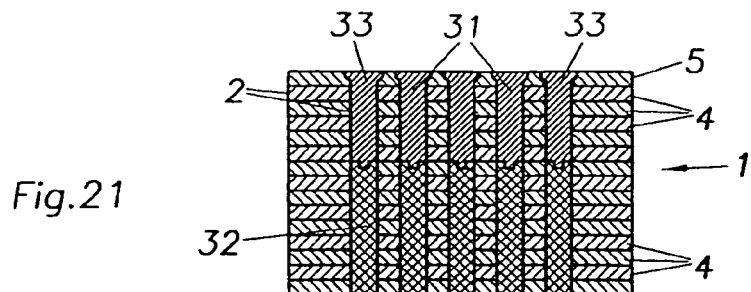
FIGS. 21 through 23 each show a schematic longitudinal section of a further embodiment of the injection mold in different operating phases.
Figure 22:
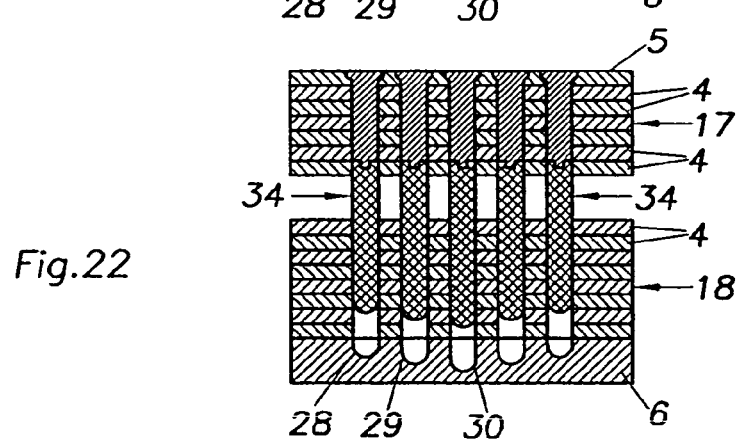

In the embodiment of FIGS. 21 to 24, bristles are injected sequentially with two different regions 31, 32 wherein the region 31 has an extended bristle root 33. The multiple-section bristles 34 (FIG. 22) injected in this fashion are subsequently removed from the mold at their ends by removing the molding plate 6 forming the bristle ends and—optionally with delay—removing the molding plates 4 of the group 18 (FIG. 22). Subsequently, at least one-transversely displaceable molding plate in the group 18 is brought into a clamping position and the entire group 18, optionally together with the terminal molding plate 6, is displaced in the opposite direction so that the part of the region 31 of the bristles 34 including the root region 33 project past the molding plate 5 at the injection side. Subsequently, the injection mold 1 (FIG. 23) is connected to a further injection mold 35 with a mold cavity 36 into which a molten polymer mass is injected with which the root regions 23 and the longitudinal sections of the regions 31 which project into the cavity 36 are injected. The mold cavity 36 may be formed so that it defines an intermediate support for the bristles or a complete brush body in which the bristle ends are embedded without gaps so that they cannot be pulled out.

Figure 23:
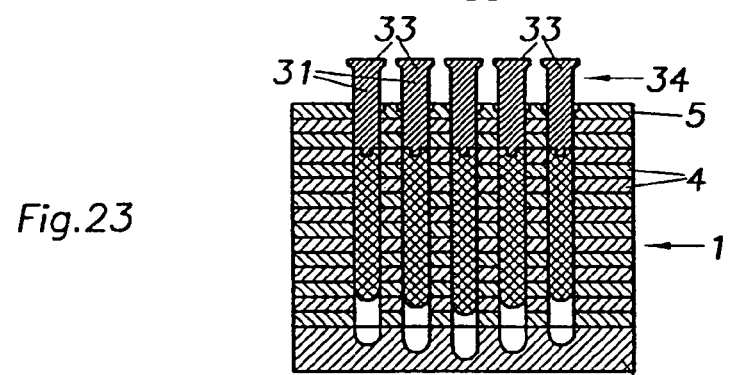
Figure 24:
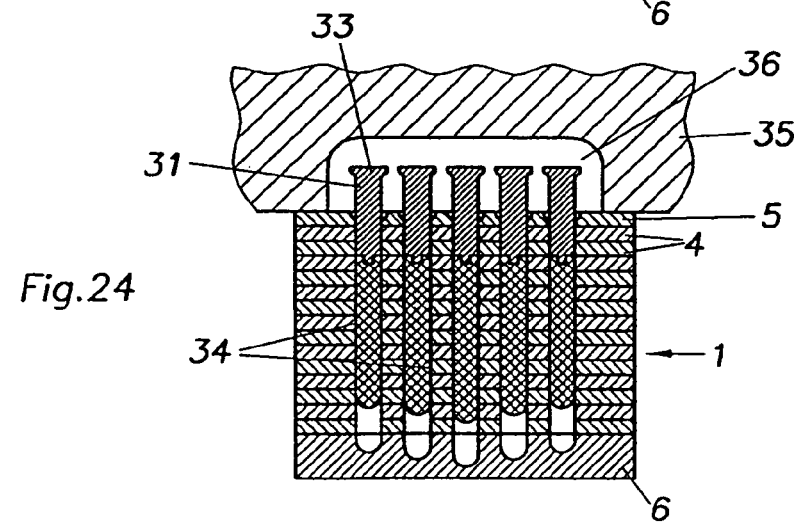
FIG. 24 shows a longitudinal section of the injection mold corresponding to FIGS. 21 to 23 with a supplementary mold.

In a modification of this embodiment, the molding channels 2 of the injection mold 1 of FIG. 21 can also be completely filled with one single molten polymer mass and, as shown in FIGS. 22 and 23, their root regions can be exposed together with the adjacent longitudinal sections for injection with the support-forming molten polymer mass (FIG. 24).

In a further modification, the bristles which are injected according to FIGS. 21 to 23 and released at their mounting-side ends can be completely released from the mold through removing the molding plate 6 forming the ends and the major part of the subsequent molding plates 4 while being held by a few, at least three, molding plates, e.g. the injection-side molding plate 5 and the two subsequent molding plates one of which can be transversely displaced to form a clamping means. These molding plates, which serve as a transport holder, can be transported together with the bristles into another injection molding station in which they are brought into connection with the injection mold 35 while simultaneously providing a new set of molding plates with injection-side molding plate 5 to complete the injection mold 1. This transport holder can move the bristles into the second injection molding station and also continue transport into other processing stations.

Figure 25:
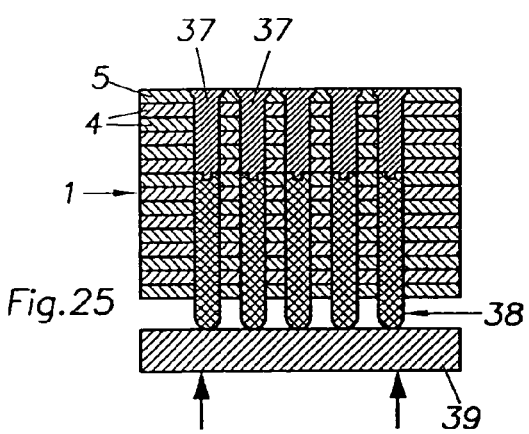
FIGS. 25, 26 each show a longitudinal section of an injection mold in a further modification and in two operating phases.
Figure 26:
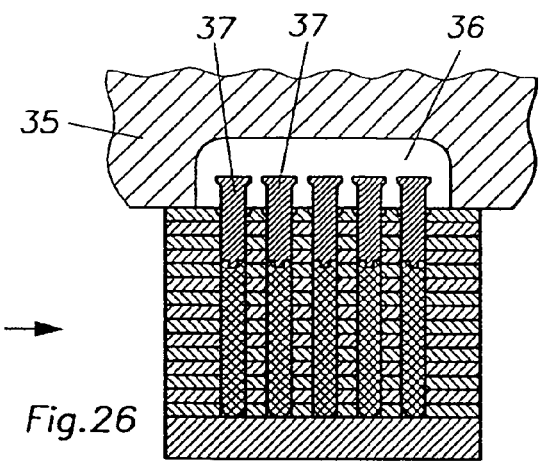

FIGS. 25 and 26 show part of an injection mold 1 with molding plates 4 and 5 after production of the bristles and removal of at least the last molding plate 6 (not shown). Replacing the latter, a flat thrust plate 39 is moved in front of the released ends with which the bristles 38 are displaced in the molding channels of the remaining molding plates until their root region 37, and optionally an adjoining longitudinal section, project past the injection-side molding plate 5 or into the mold cavity 36 of the further injection mold 35 and are injected with a molten polymer mass to form a bristle support or a brush body.

Figure 27:
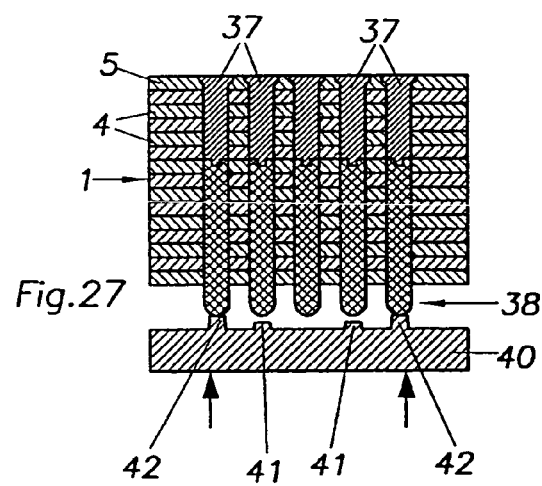
FIGS. 27, 28 each show a longitudinal section corresponding to FIGS. 25, 26 with a contoured thrust plate.
Figure 28:
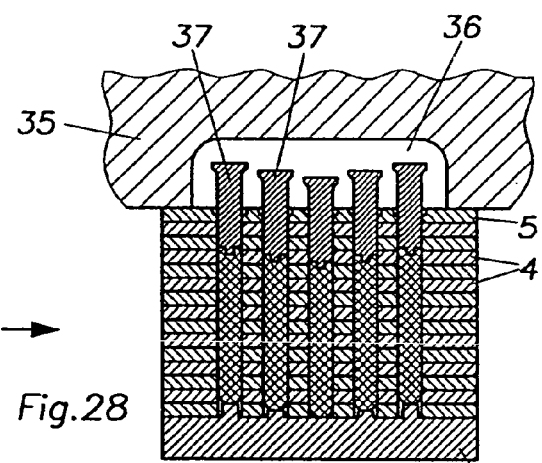

FIGS. 27 and 28 show an embodiment with which, after production of the bristles 38 as described with reference to FIGS. 25 and 26, instead of the flat thrust plate 39, a thrust plate 40, which has cam-like projections 41 and 42 of different heights, is moved in front of the released bristle ends. When the thrust plate 40 has been moved towards the molding plates 4, the bristles are displaced along the thrust path to different depths within the molding channels so that their root region 37 projects into the mold cavity 36 of the injection mold 35 to different depths and the bristle ends lie on a curved envelope surface after injection and removal of the thrust plate 40 and molding plates 4 and 5.

Figure 29:
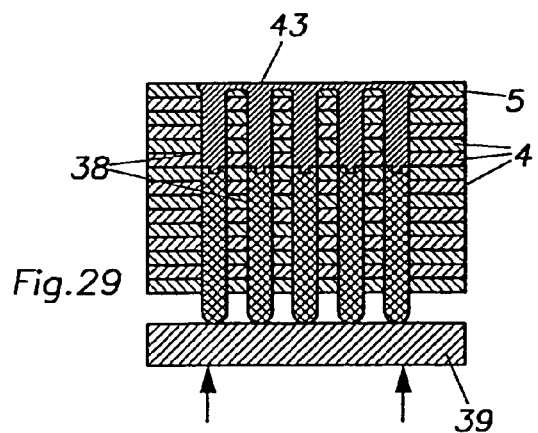
FIGS. 29, 30 each show a longitudinal section corresponding to FIGS. 25, 26 with another blank mold.
Figure 30:
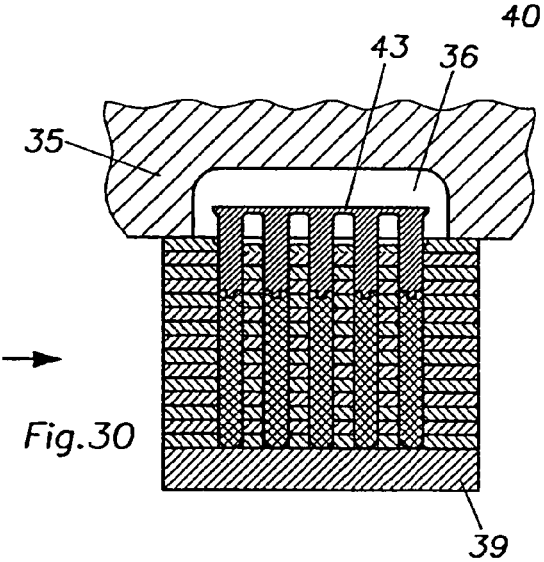

FIGS. 29 and 30 show an embodiment which differs from that of FIGS. 25 and 26 only in that the bristles 38 are interconnected in the region of the injection-side molding plate 5 via a connection 43 in the form of bars, grids or the like and project with the connection 43 and the subsequent longitudinal sections of the bristles 38 into the cavity 36 of the injection mold 35 after displacement via the thrust plate 39.

A smaller group of molding plates 4, preferably including the injection-side molding plate 5 and with at least one molding plate 4 which can be transversely displaced to act as clamping means, may serve as transport holder for transferring the bristles into further injection molding stations, processing stations or the like.

Figure 31:
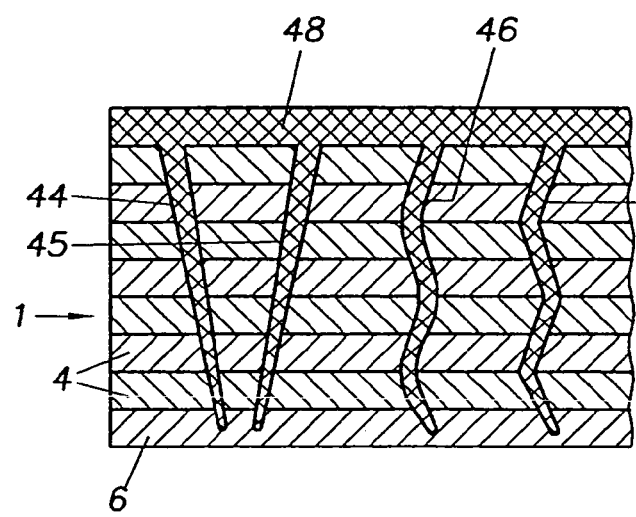
FIG. 31 shows a schematic longitudinal section through an injection mold for producing bristles of different longitudinal extension.
Figure 32:
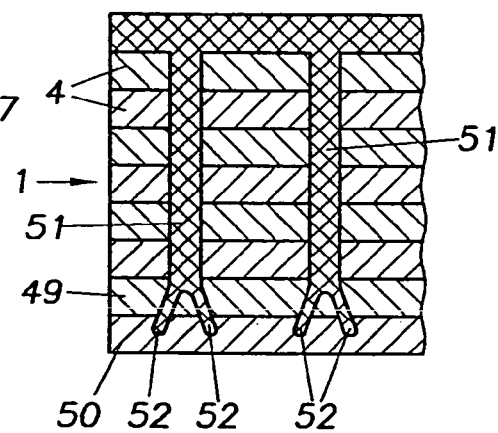
FIG. 32 shows a schematic section through an injection mold for producing bristles with branched bristle ends.

The layered structure of the injection mold from a plurality of molding plates and the thereby possible sectional removal from the mold and the increase in the modulus of elasticity and tensile strength obtained by the inventive method parameters of injection pressure and flow speed in the molding channel permit production of bristles whose central axis is not in the direction of release from the mold. FIGS. 31 and 32 show examples thereof. FIG. 31 shows a part of an injection mold with slanting molding channels 44, 45 that are inclined towards each other in this embodiment. In addition to or alternatively, the injection mold 1 may have wavy, curved molding channels 46 or molding channels 47 with several bends so that correspondingly formed bristles are produced which can be injected in a composite action via a connection 48. For release from the mold, the molding plates 4 and 6 are removed, starting with molding plate 6, and the bristles are released in sections without being deformed due to their high bending elasticity and the small release length.

The bristles may be fabricated into a brush after separation of the connection, individually or in groups or together with the connection 48 through injection around it or through other conventional thermal or mechanical connection methods.

In the embodiment of FIG. 32, the injection mold 1 has layered molding plates 4 and two end molding plates 49, 50 that form distinctively branched bristle ends. The injection-molded bristles 51 each have finger-like bristle ends 52 which can be easily removed from the mold due to the thin molding plates and the increased stability of the bristles.

The molding plates 6 or 49, 50 which form the bristle ends can be made from a sintered metal, in particular, for distinctly branched bristle ends which also provides additional venting in this region to effectively prevent trapping of air. The molding plates 4 can, of course, also be made from such sintered metals to support venting of the molding channels. Micro-roughnesses which exist e.g. in sintered metals or which can be produced through surface treatment of the molding channel produce corresponding roughnesses in the micro region on the surface of the finished bristle which have a moisture repellant "Lotus" effect during use of the bristle.

Figure 33:
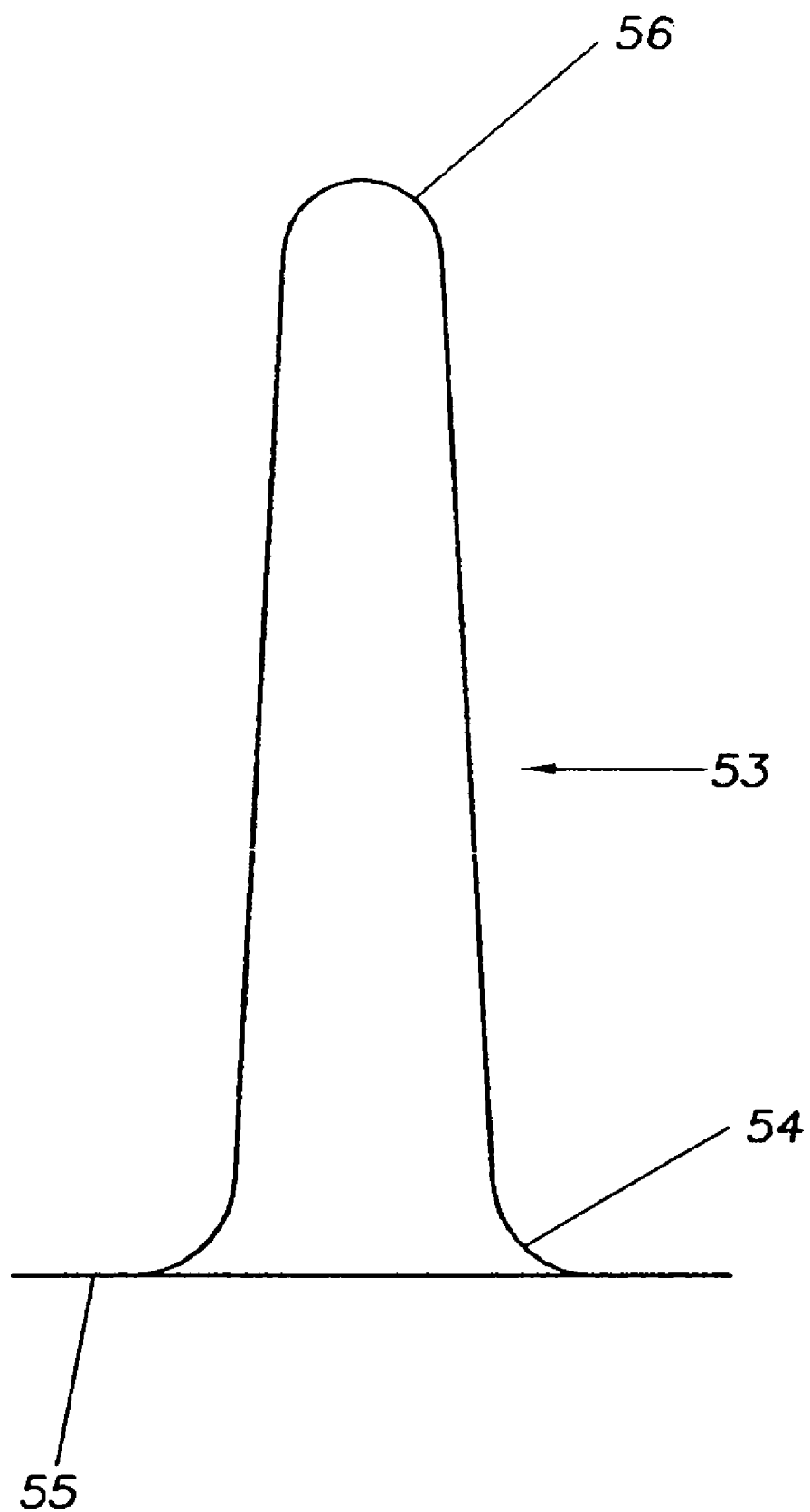
FIG. 33 shows a highly enlarged schematic view of a bristle.

FIG. 33 shows one individual bristle 53 which can be used in particular for hygiene brushes, e.g. toothbrushes, cleaning brushes in the medical and hospital fields or as cleaning or application brushes in the food industry. Suitable setting of injection pressure and flow velocity (core speed) in the bristle-molding channel permits optimum adaptation of the bending behavior of the bristle along its length to the respective purpose of use, the bristles having an average diameter of 0.3 to 3 mm. They can widen like a trumpet in the root region 54 to obtain a relatively bending-resistant shoulder, which also forms a smooth transition to the surface of the brush body 55. This entire gap-free region, the stem base and the actual stem of the brush 53 and the bristle end 56, which is uniformly rounded in the present case, can be produced with injection molding technology to have smooth walls or walls with micro-roughnesses to prevent occurrence of unwanted roughnesses and soiling. Due to these properties, the brushes having bristles of this type can also be easily cleaned and/or disinfected after use since no pockets, gaps or the like are present. Bristles having this shape and the properties designed for the application can neither be produced by extrusion nor by injection molding methods known to date.

Figure 34:
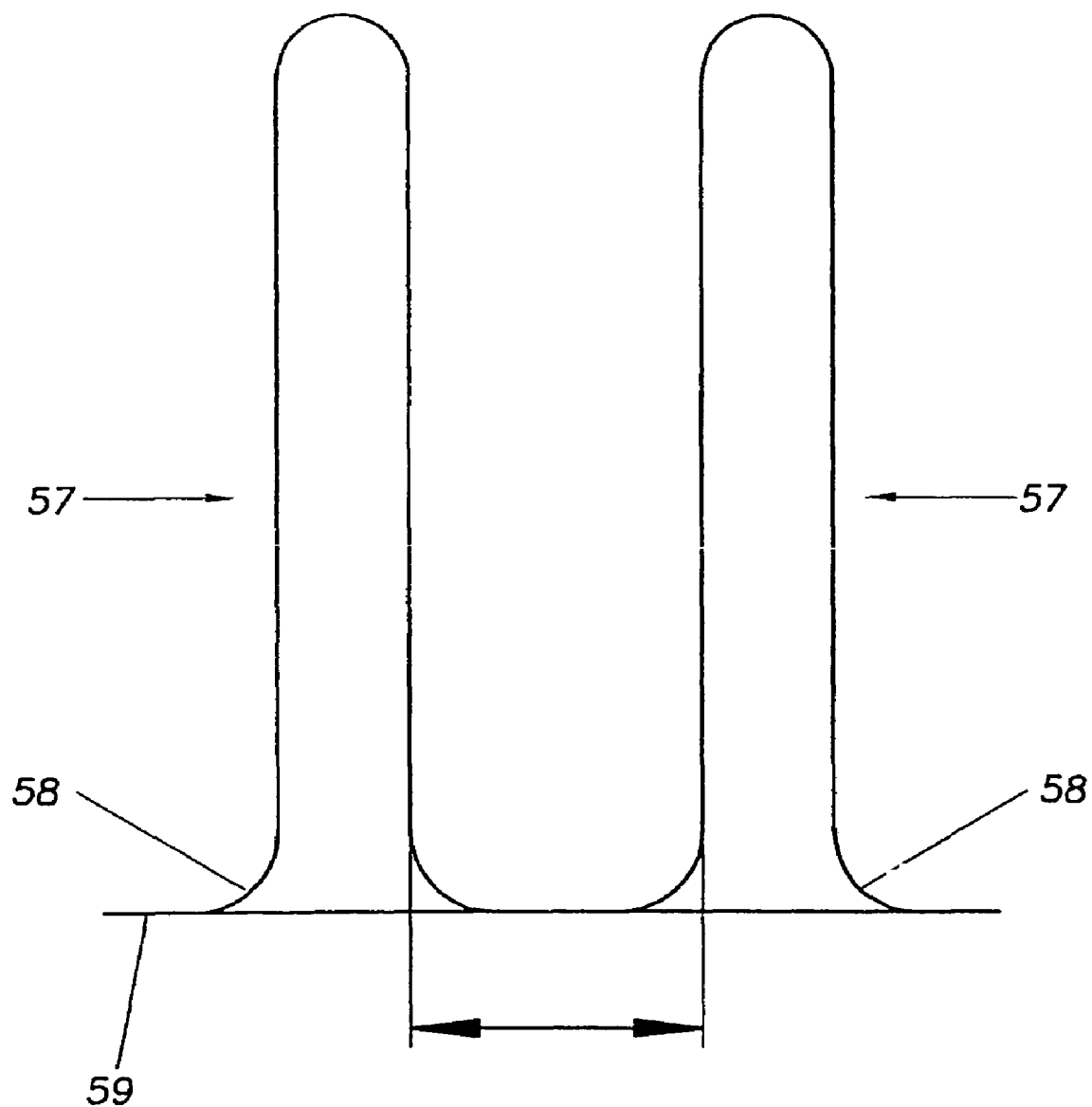
FIG. 34 shows a highly enlarged schematic view of the arrangement of two bristles.

FIG. 34 shows two neighboring bristles 57, which are combined at their trumpet-like rounded root region 58 via a connection indicated with 59. Using the inventive method, the bristles 57 with the connection 59 can be disposed at a slight separation from each other, which can, moreover, be optimally adjusted to the respective purpose of application. The bristles 57 can be positioned very closely to prevent moisture, dirt or bacteria deposits or remnants following rinsing.

Figure 35:
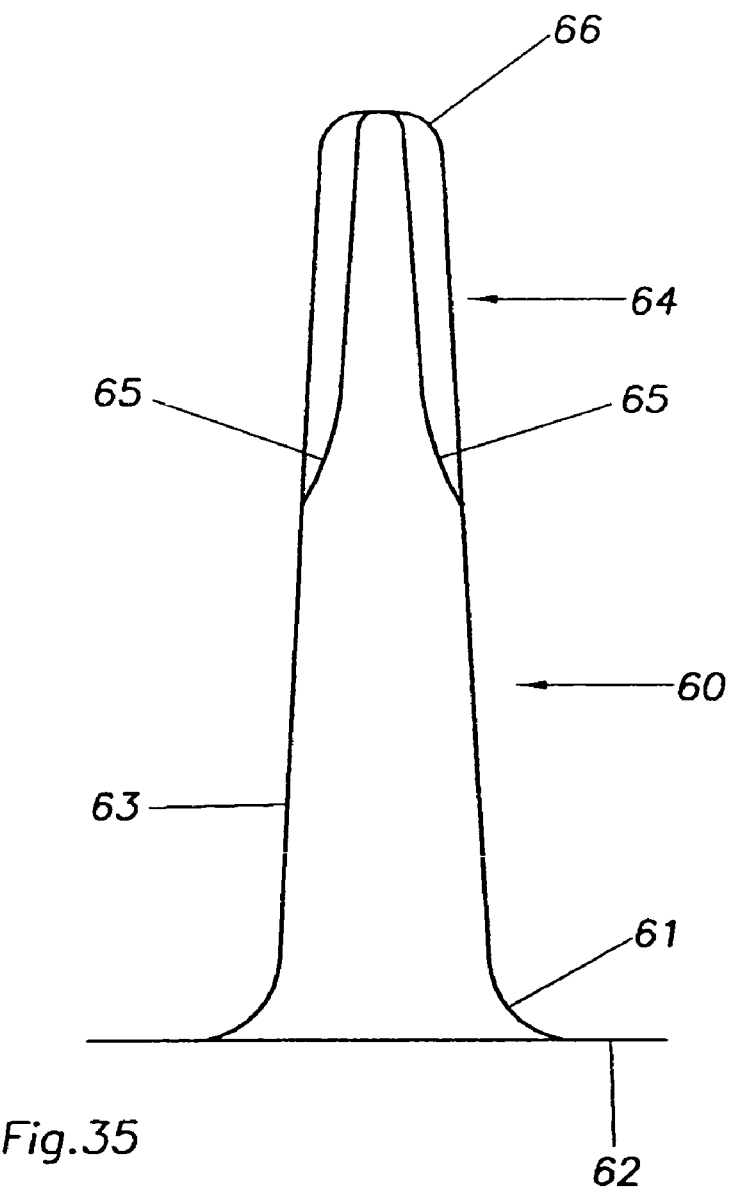
FIG. 35 shows a highly enlarged schematic view of a further embodiment of the bristle.
Figure 36:
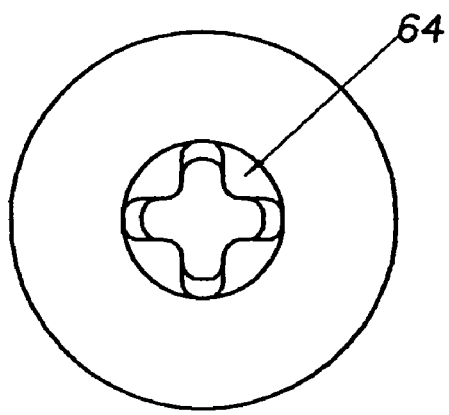
FIG. 36 shows a top view onto the free end of the bristle of FIG. 35.

FIG. 35 shows a view of and FIG. 36 a top view onto a bristle 60 produced according to the inventive method, which merges like a trumpet into the bristle support surface 62 in the root region 61 and has a stem 63 with relatively high bending strength and an effective region 64 with profiled shape. In this embodiment, the effective region 64 has a cross-shaped cross-section, which gradually merges 65 into the stem region. The cross-shaped cross-section of the effective region 64 forms brushing edges, which become effective under strong loading of the brush and bending of the effective region. With reduced pressure, this effect occurs at the rounded bristle end 66, which also has a cross-shaped profile. The bristle end 66 can moreover penetrate into corners, gaps and furrows for cleaning it. The same effects can be obtained with other polygonal cross-sectional shapes.

I claim:

1. A method for producing a bristle from a thermoplastic polymer by injection molding a molten polymer mass into a bristle molding channel, said channel having a predetermined length and a predetermined cross sectional shape along said length, the method comprising the steps of:
    (a) injecting the molten polymer mass into said channel under pressure, said pressure being selected in dependence on said cross sectional shape of said channel, a ratio of a largest width of a cross section of said channel to said length of said channel being selected as less than or equal to 1:10,
    wherein said injection pressure is 2000 to 5000 bar ($2\times10^5$ kPa to $5\times10^5$ kPa), and sufficient to provide a specific pressure in a bristle forming channel of more than 300 bar ($0.3\times10^5$ kPa); and
    b) venting said channel along said length during step a), wherein a shear flow is established with a core speed of approximately 1000 mm/s in a center of molten polymer mass flow and with a large shearing effect due to wall friction of the molten polymer mass under distinct longitudinal orientation of polymer molecules, at least in a portion of the molten polymer mass proximate a wall of said channel, said longitudinal orientation of the polymer molecules being maintained throughout said length of said channel.

2. The method of claim 1, wherein said injection pressure is set to support crystal seed formation between neighboring longitudinally oriented molecular sections in dependence on said cross sectional shape and said length of said bristle-molding channel.

3. The method of claim 1, wherein said bristle-molding channel is cooled.

4. The method of claim 1, wherein said bristle-molding channel is vented transverse to a flow direction of the molten polymer mass.

5. The method of claim 4, wherein said bristle-molding channel is vented in several planes disposed transverse to a flow direction of the molten polymer mass.

6. The method of claim 5, wherein said bristle-molding channel is vented along said length via planes disposed at approximately equal distances.

7. The method of claim 1, wherein said bristle-molding channel is vented of air displaced by flow pressure of the molten polymer mass.

8. The method of claim 1, wherein said channel is vented with assistance of an external underpressure.

9. The method of claim 1, wherein said cross section of said bristle-molding channel remains substantially constant, beginning at an injection side thereof.

10. The method of claim 1, wherein said cross section of said bristle-molding channel tapers substantially continuously from an injection side thereof.

11. The method of claim 1, wherein the molten polymer mass is injected into an inlet region which narrows like a nozzle towards said bristle-molding channel to produce an extension flow.

12. The method of claim 1, wherein said cross sectional shape of said bristle-molding channel has at least one discontinuity configured as a tapering in a flow direction of the molten polymer mass.

13. The method of claim 1, wherein said cross section of said bristle-molding channel is selected to have a maximum width of $\leq 3$ mm.

14. The method of claim 1, wherein a ratio of a largest width of said channel to said length of said channel is selected to be $\leq 1:250$.

15. The method of claim 1, wherein the molten polymer mass is simultaneously injected into several neighboring bristle-molding channels thereby forming a corresponding number of bristles.

16. The method of claim 15, wherein, the molten polymer mass is injected into neighboring bristle-molding channels while simultaneously forming a connection between at least two bristles.

17. The method of claim 15, wherein, after injection of the bristles, a molten polymer mass of another polymer is subsequently injected, thereby forming a connection between at least two bristles.

18. The method of claim 15, wherein the molten polymer mass is injected to form a bristle support which connects at least two or more bristles.

19. The method of claim 16, wherein the molten polymer mass is injected to form a bristle support which connects the bristles and forms a brush body.

20. The method of claim 18, wherein at least one further molten polymer mass from another polymer is injected onto said bristle support.

21. The method of claim 15, wherein a number of bristles are injected with different lengths.

22. The method of claim 15, wherein a number of bristles are injected with different cross sections.

23. The method of claim 15, wherein a number of bristles are injected with a cross sectional shape which changes along their lengths.

24. The method of claim 15, wherein a plurality of bristles are injected with parallel mutual orientation.

25. The method of claim 15, wherein at least one part of the bristles is injected in a non-parallel fashion.

26. The method of claim 15, wherein bristles of a same geometry but different bending elasticity (hardness) are produced through injection-molding of different molten polymer masses in same molding channels.

27. The method of claim 1, wherein the bristles are injected from a polymer or a polymer mixture which has reduced secondary binding forces in a solidified state.

28. The method of claim 1, wherein the bristles are injected from a polymer including additives which become active during use.

* * * * *